(12) United States Patent
Bressoud et al.

(10) Patent No.: US 7,213,063 B2
(45) Date of Patent: May 1, 2007

(54) METHOD, APPARATUS AND SYSTEM FOR MAINTAINING CONNECTIONS BETWEEN COMPUTERS USING CONNECTION-ORIENTED PROTOCOLS

(75) Inventors: Thomas Charles Bressoud, Summit, NJ (US); Lorenzo Alvisi, Austin, TX (US); Ayman M. El-Khashab, Austin, TX (US); Phoebe Kay Weidmann, Austin, TX (US)

(73) Assignees: Lucent Technologies Inc., Murray Hill, NJ (US); University of Texas at Austin, Austin, TX (US)

( * ) Notice: Subject to any disclaimer, the term of this patent is extended or adjusted under 35 U.S.C. 154(b) by 602 days.

(21) Appl. No.: 09/764,247

(22) Filed: Jan. 17, 2001

(65) Prior Publication Data
US 2001/0056492 A1 Dec. 27, 2001

Related U.S. Application Data

(60) Provisional application No. 60/176,522, filed on Jan. 18, 2000.

(51) Int. Cl.
*G06F 15/16* (2006.01)
*G06F 15/173* (2006.01)
*H04L 12/28* (2006.01)
*H04L 12/56* (2006.01)

(52) U.S. Cl. .............. 709/223; 709/203; 709/224; 709/227; 709/228; 709/230

(58) Field of Classification Search .............. 709/227, 709/228, 230, 203, 223, 224
See application file for complete search history.

(56) References Cited

U.S. PATENT DOCUMENTS

| 5,027,269 | A  | * | 6/1991  | Grant et al. ............... 709/224 |
| 5,566,297 | A  | * | 10/1996 | Devarakonda et al. ....... 714/15 |
| 5,796,934 | A  | * | 8/1998  | Bhanot et al. .............. 714/4 |
| 6,016,500 | A  | * | 1/2000  | Waldo et al. ............... 709/203 |
| 6,018,805 | A  | * | 1/2000  | Ma et al. ................... 709/230 |
| 6,212,175 | B1 | * | 4/2001  | Harsch ...................... 370/338 |
| 6,330,690 | B1 | * | 12/2001 | Nouri et al. ................ 709/223 |
| 6,351,487 | B1 | * | 2/2002  | Lu et al. .................... 709/232 |
| 6,457,050 | B1 | * | 9/2002  | Cowan et al. ............... 709/224 |
| 6,523,130 | B1 | * | 2/2003  | Hickman et al. ............ 714/4 |
| 6,671,721 | B1 | * | 12/2003 | Branson et al. ............. 709/224 |
| 6,721,288 | B1 | * | 4/2004  | King et al. ................. 709/203 |
| 2002/0078208 | A1 | * | 6/2002 | Crump et al. ............... 709/227 |

* cited by examiner

*Primary Examiner*—Zarni Maung
*Assistant Examiner*—Hassan Phillips
(74) *Attorney, Agent, or Firm*—Barry H. Freedman

(57) ABSTRACT

The present invention provides a system, method and apparatus for maintaining a connection between a server and a client by receiving a message, determining whether to store one or more elements of the message, storing the one or more elements of the message when the one or more elements of the message are to be stored, transmitting the message, and determining whether the server has failed and when the server has failed, restoring the server to a pre-failure connection state using the one or more stored message elements.

8 Claims, 14 Drawing Sheets

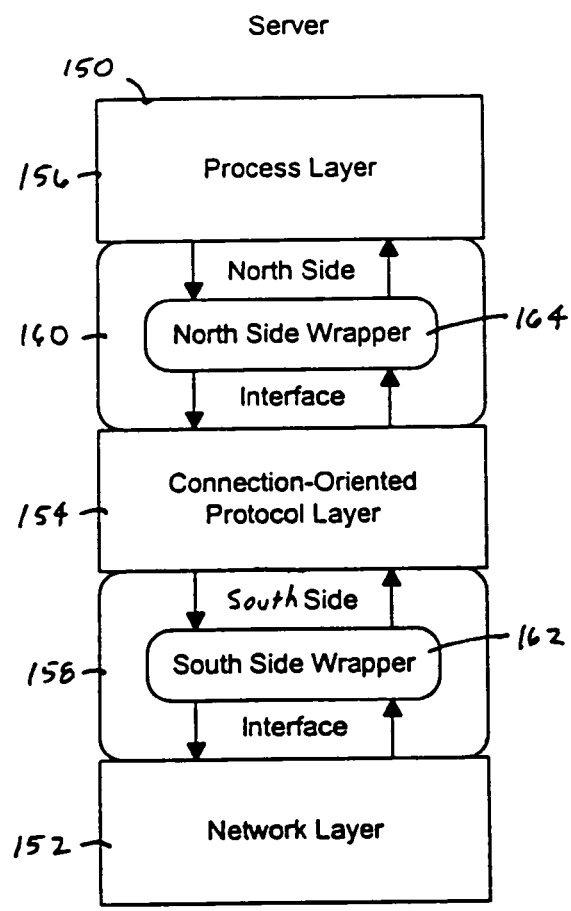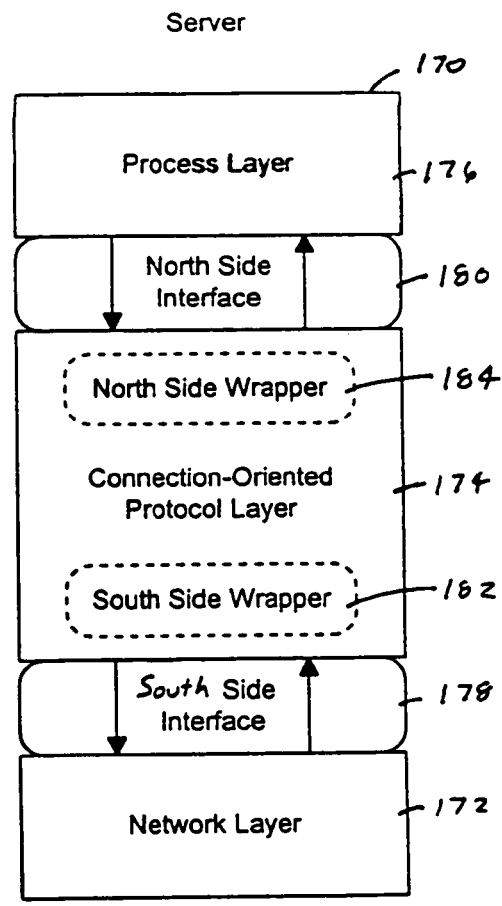
FIG. 3A
FIG. 3B

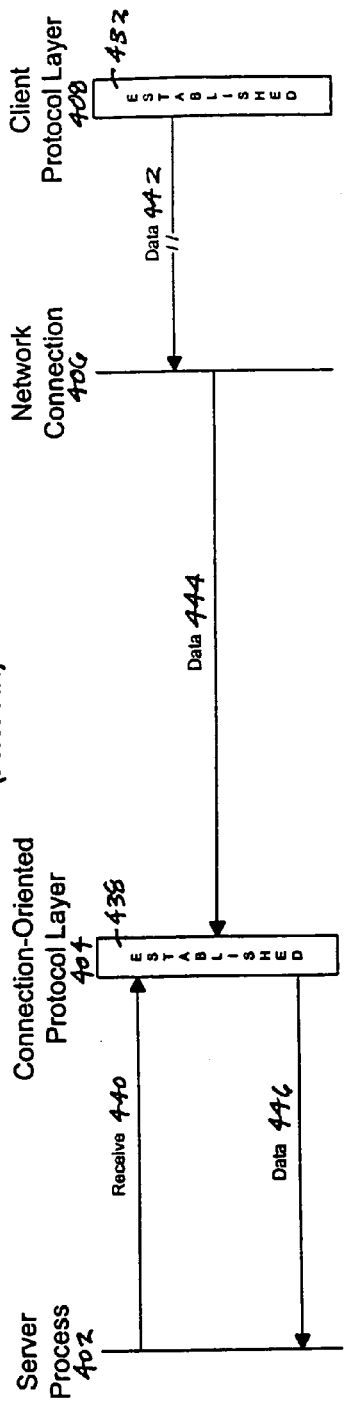
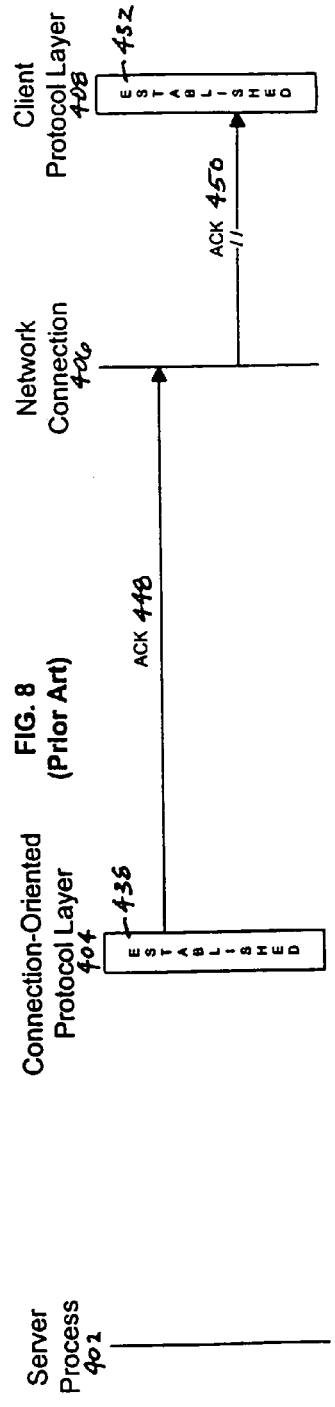
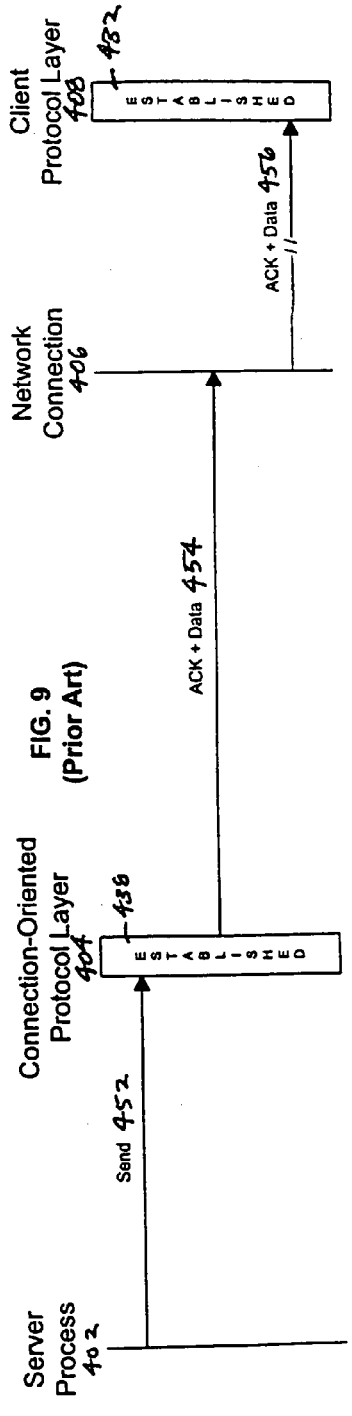

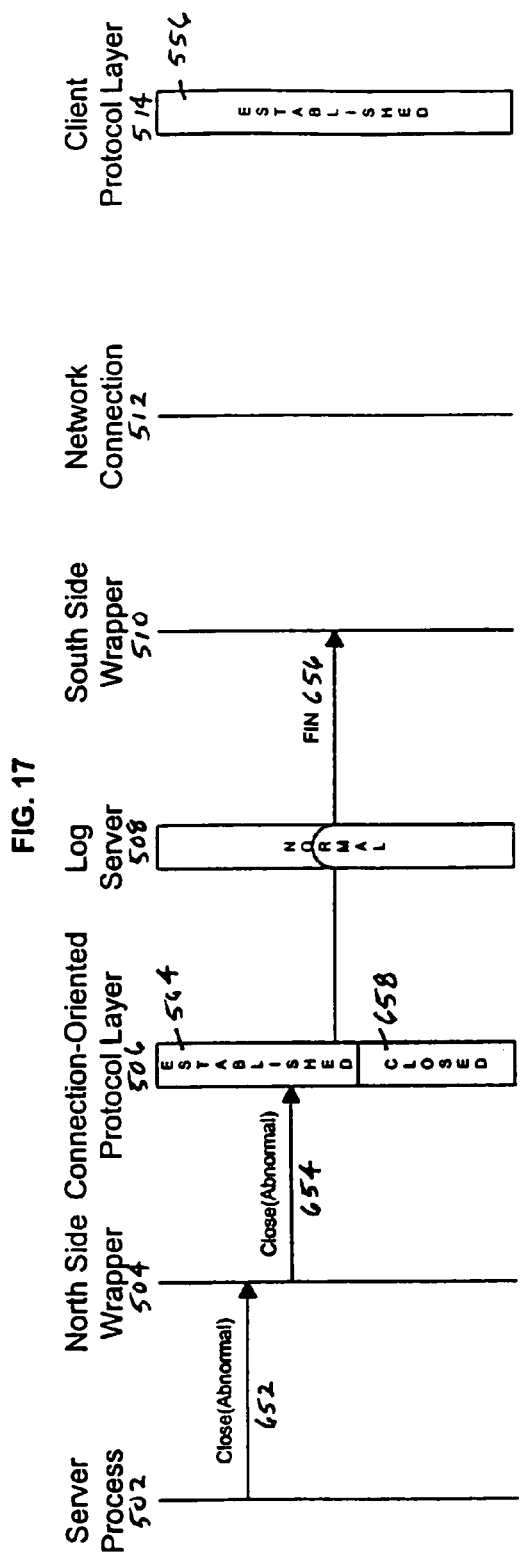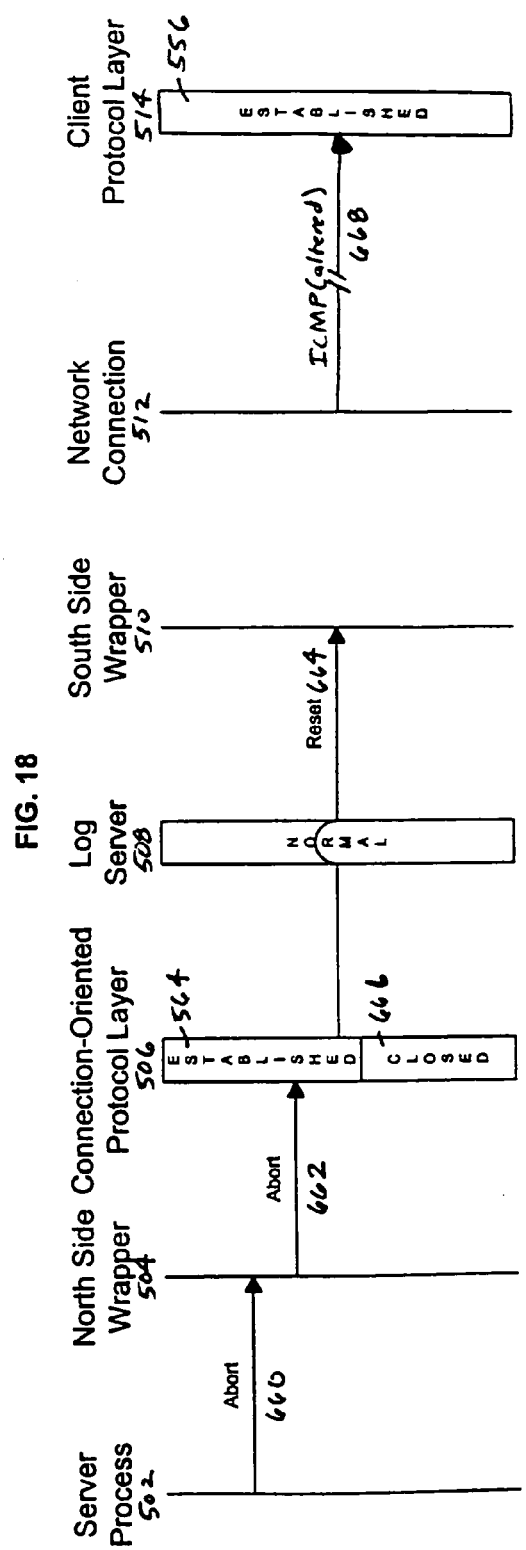

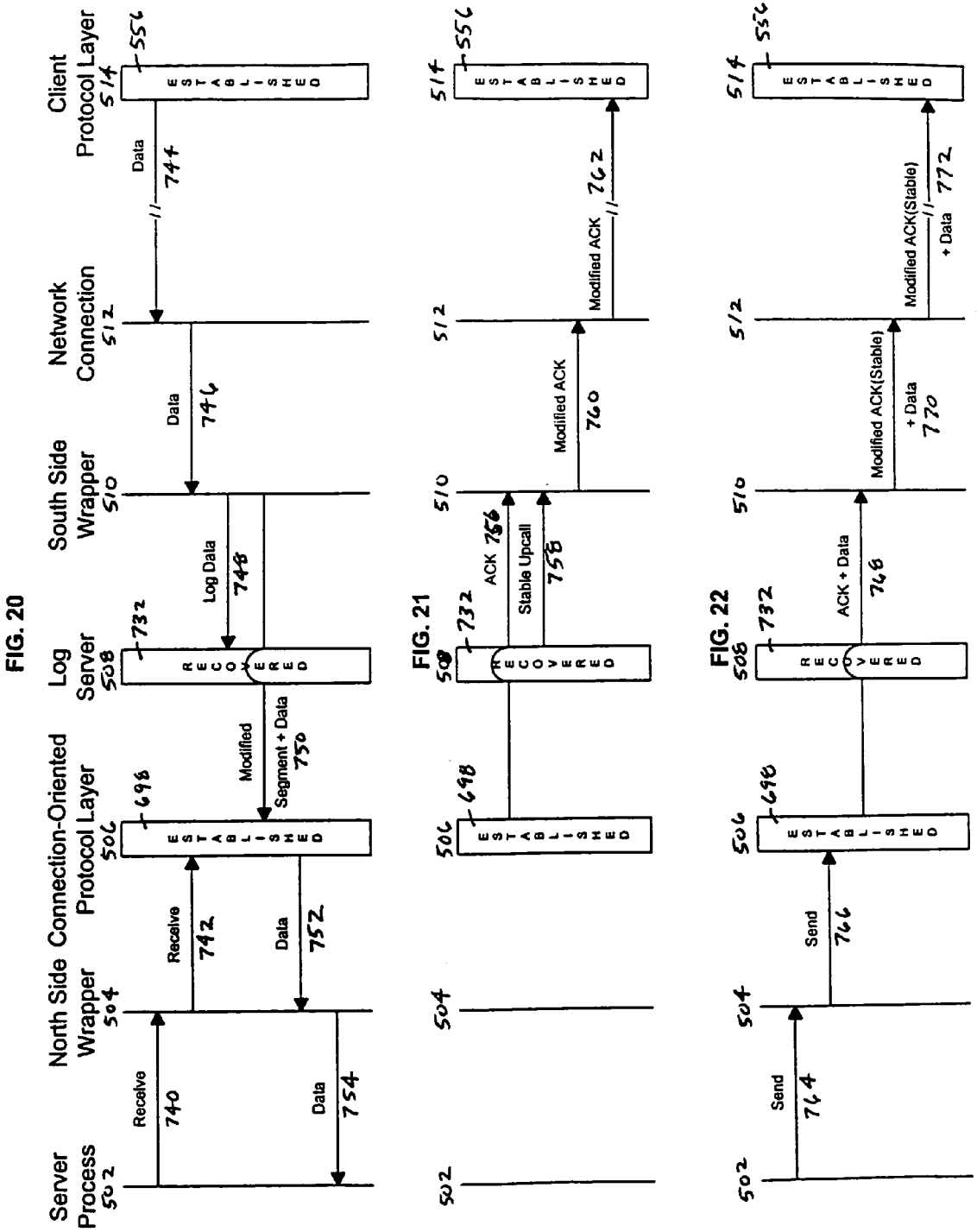

METHOD, APPARATUS AND SYSTEM FOR MAINTAINING CONNECTIONS BETWEEN COMPUTERS USING CONNECTION-ORIENTED PROTOCOLS

CROSS REFERENCE TO RELATED APPLICATION

This application claim priority of Provisional Application Ser. No. 60/176,522 which was filed on Jan. 18, 2000.

FIELD OF THE INVENTION

This present invention relates generally to data communication and more particularly to a method, apparatus and system for maintaining connections between computers using connection-oriented protocols.

BACKGROUND OF THE INVENTION

Without limiting the scope of the present invention, this background of the present invention is described in connection with connection-oriented communication protocols, such as the Transmission Control Protocol ("TCP").

There are several software-based techniques, such as active replication, semi-active replication, primary-backup, and rollback recovery, that attempt to provide computational fault tolerance. These techniques focus on protecting the state of applications residing within user-level processes. Efforts to apply these techniques to protect the state maintained within the operating system, however, have been largely unsuccessful. Typically, these efforts assume very restricted interactions with the operating system and interactions with the environment through restricted interfaces. In practice, however, applications interact with the operating systems in unrestricted ways and communicate both with the full set of devices on the local machine and with other processes through connection-oriented communication protocols such as TCP. As a result, even applications that rely on sophisticated techniques for recovering from crashes at the user process level do not achieve the desired level of fault-tolerance.

For example, a fundamental problem in computer networks is to determine an optimal path from a source to any destination in the network. This problem is especially critical in networks of the size of the Internet, where computer and network failures constantly modify the topology of the network. To monitor the network, a set of dedicated IP routers and wide-area network core switches (for Frame Relay and/or ATM) run special protocols, such as the Border Gateway Protocol ("BGP"), which they use to exchange information with their peers when they detect a change in the topology of the underlying network. To achieve greater reliability, many IP routers use a primary-backup fault-tolerant protocol implemented on a hardware-supported process-pair architecture. When a primary router process in this architecture fails, the backup process automatically begins to function as the router and the state of the backup process will typically be indistinguishable from the state of the primary process at the time it failed. Computer systems that implement this process-pair architectures are significantly more expensive than their non-fault tolerant counterparts.

Unfortunately, even these expensive dedicated computer systems cannot prevent the failure of the primary process from having undesirable side-effects. The reason is that these Systems are unable to mask the loss of application state at the operating system level, and Border Gateway protocols are built on top of TCP, whose state is maintained within the operating system. When the primary router fails, the TCP connections that it was maintaining with all the peers participating in the BGP are severed. The surviving peers interpret the loss of these connections as a failure of the primary router and initiate state changes through the BGP to reestablish routing around the failed primary router. When the backup router takes over for the primary router, it reestablishes BGP sessions with its peers and routing can resume through the recovered component. Before the takeover completes, however, the primary router has incurred costs in network capacity, delays, lost packets in transit, etc. Even though these IP routers and core switches include hardware redundancy to tolerate failures and have the ability to fail over the application services in less than a second to a backup process, the architecture of the BGPs still exhibits the side effects of the severed TCP connections, and the rest of the network still transitions the faulty IP router to an out of service state.

This example demonstrates a more general problem that occurs whenever applications running on top of connection-oriented protocols, such as TCP, use the loss of a connection as a failure-detection mechanism. As a result, the application's response to the loss of the connection may generate unwanted side effects, such as a change in the content of the network routing tables, even if the failed node has state-of-the-art fault-tolerance capabilities.

SUMMARY OF THE INVENTION

Other features and advantages of the present invention shall be apparent to those of ordinary skill in the art upon reference to the following detailed description taken in conjunction with the accompanying drawings.

The present invention allows connection-oriented protocols, such as TCP, IPX, NetWare and SS7, to keep open the connections maintained by a crashed process while the process recovers. A process connected with a crashed process using the present invention cannot detect any anomaly in the behavior of its connections: the failure and recovery of the crashed process are completely transparent. In addition, the present invention does not require any modification to existing connection-oriented protocol implementations, nor does it need to be used by both processes at the endpoints of a connection in order to function. As a result, computer servers using the present invention can crash and recover transparently without dropping their connections even if none of their clients are using the present invention.

The present invention provides a method for maintaining a connection between a server and a client by receiving a message, determining whether to store one or more elements of the message, storing the one or more elements of the message when the one or more elements of the message are to be stored, transmitting the message, and determining whether the server has failed and when the server has failed, restoring the server to a pre-failure connection state using the one or more stored message elements.

In addition, the present invention provides a method for maintaining a connection to an application by receiving a message, determining whether to delay, discard, store or modify the message, delaying the transmission of the message until one or more conditions are satisfied when the message is to be delayed, discarding the message when the message is to be discarded, storing one or more elements of the message when the message is to be stored, modifying one or more elements of the message when the message is to be modified, transmitting the message when the message was not to be discarded, and determining whether the server has failed and when the server has failed, restoring the server to a pre-failure connection state using the one or more stored message elements and periodically transmitting an outgoing message to the client to maintain the connection until the server is restored.

The present invention also provides a computer program embodied on a computer readable medium for maintaining a connection between a server and a client. The computer program includes a code segment for receiving a message, a code segment for determining whether to store one or more elements of the message, a code segment for storing the one or more elements of the message when the one or more elements of the message are to be stored, a code segment for transmitting the message, and a code segment for determining whether the server has failed and when the server has failed, restoring the server to a pre-failure connection state using the one or more stored message elements.

Moreover, the computer program may include a code segment for receiving a message, a code segment for determining whether to delay, discard, store or modify the message, a code segment for delaying the transmission of the message until one or more conditions are satisfied when the message is to be delayed, a code segment for discarding the message when the message is to be discarded, a code segment for storing one or more elements of the message when the message is to be stored, a code segment for modifying one or more elements of the message when the message is to be modified, a code segment for transmitting the message when the message was not to be discarded, and a code segment for determining whether the server has failed and when the server has failed, restoring the server to a pre-failure connection state using the one or more stored message elements and periodically transmitting an outgoing message to the client to maintain the connection until the server is restored.

The present invention also provides an apparatus having a process layer, a protocol layer coupled to the process layer through a first wrapper, a network interface coupled to the protocol layer through a second wrapper, and a log server coupled to the first wrapper and the second wrapper.

In addition, the present invention provides a system having a server computer having a process layer, a protocol layer coupled to the process layer through a first wrapper, and a network interface coupled to the protocol layer through a second wrapper. The system also includes a log server coupled to the first wrapper and the second wrapper, one or more client computers, and one or more network connections between the one or more client computers and the network interface of the server computer.

BRIEF DESCRIPTION OF THE DRAWINGS

The above and further advantages of the invention may be better understood by referring to the following description in conjunction with the accompanying drawings, in which:

FIGS. 3A and 3B are block diagrams of two general server architectures in accordance with the present invention;

FIG. 7 depicts a TCP normal incoming data sequence in accordance with the prior art;

FIG. 8 depicts a TCP normal outgoing acknowledgment sequence in accordance with the prior art;

FIG. 9 depicts a TCP normal outgoing acknowledgment with data sequence in accordance with the prior art;

FIG. 17 depicts a TCP process initiated abnormal close sequence in accordance with one embodiment of the present invention;

FIG. 18 depicts a TCP process initiated abort sequence in accordance with one embodiment of the present invention;

FIG. 20 depicts a TCP post-recovery incoming data sequence in accordance with one embodiment of the present invention;

FIG. 21 depicts a TCP post-recovery outgoing acknowledgment sequence in accordance with one embodiment of the present invention;

FIG. 22 depicts a TCP post-recovery outgoing acknowledgment with data sequence in accordance with one embodiment of the present invention.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
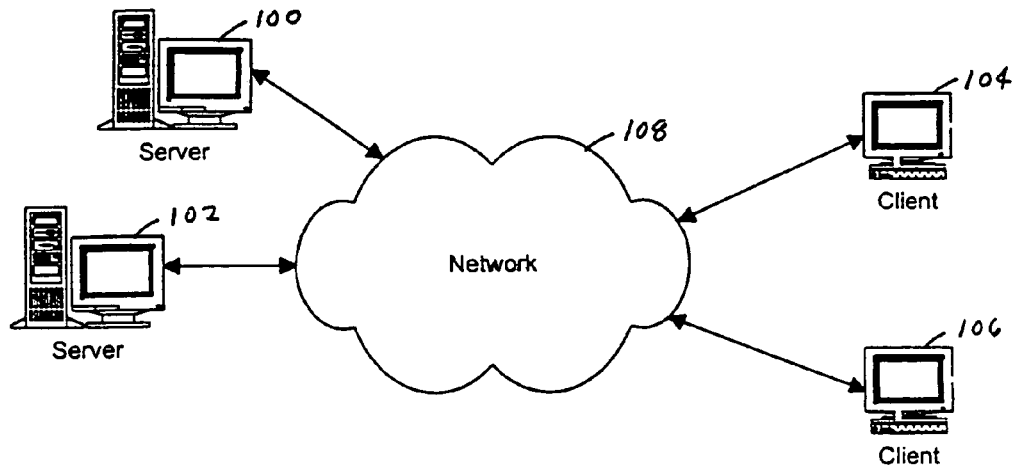
FIG. 1 is a block diagram of a basic prior art network architecture.
Figure 2:
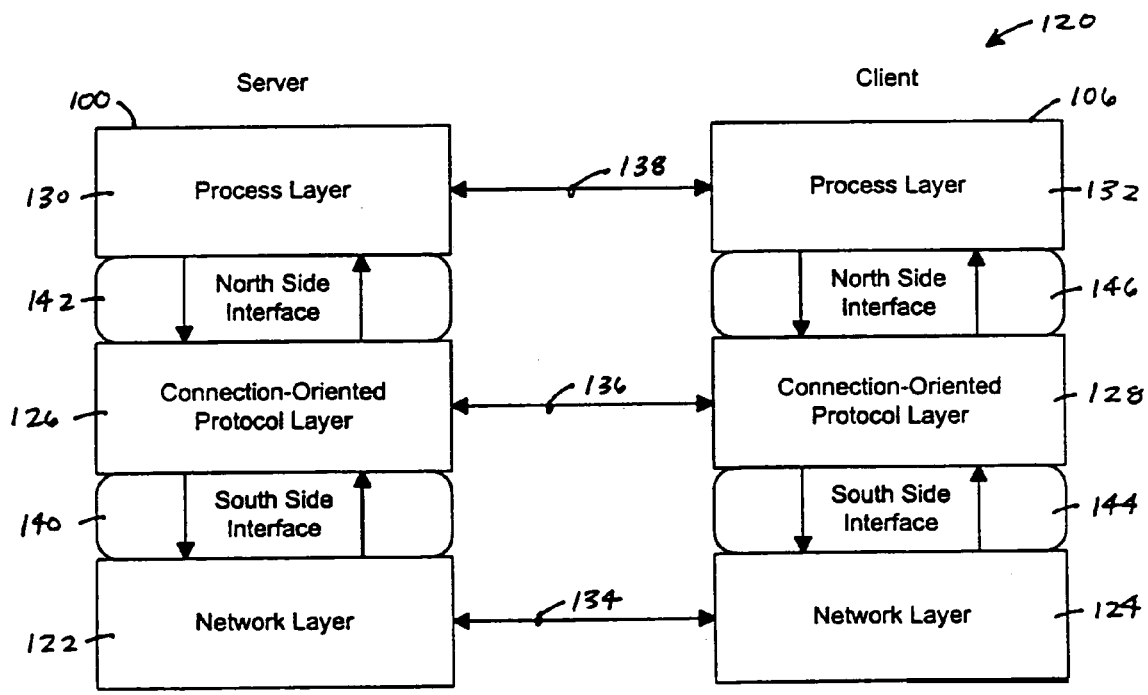
FIG. 2 is a block diagram of a general prior art server architecture.

Now referring to FIGS. 1 and 2, a basic network architecture and a general computer architecture in accordance with the prior art are shown. A number of computers 100, 102, 104 and 106 are connected together via a communications network 108. The network 108 may be the Internet, a wide area network or a local area network. As illustrated, computers 100 and 102 are server computers that contain one or more processes or applications. If computers 100, 102, 104 and 106 are using connection-oriented protocols, such as the Transmission Control Protocol ("TCP"), they typically will operate in a three-layer communications framework 120. The three-layer communications framework 120 for server computer 100 and client computer 106 contains a network layer 122 and 124, a connection-oriented protocol layer 126 and 128, and a process layer 130 and 132. In this layered architecture, each layer logically communicates with its peer at the same level (illustrated by lines 134, 136 and 138). For example, the connection-oriented protocol layer 128 of the client computer 106 can initiate a connection with the connection-oriented protocol layer 126 of the server computer 100 and vice versa. Note that framework 120 is often described as a four-layer communications framework wherein the connection-oriented protocol layer 126 and 128 is split into an internet layer and a host-to-host layer.

In addition, the three-layer communication framework 120 defines two interfaces within server computer 100 that are relative to the connection-oriented protocol layer 126: a north side interface 142 between the process layer 130 and the connection-oriented protocol layer 126; and a south side interface 140 between the connection-oriented protocol layer 126 and the network layer 122. The north side interface 142 includes entry points for processes running in the process layer 130 to request establishment and termination of connections with their peers, as well as send and receive data requests. The south side interface 140 includes entry points for transmitting, or re-transmitting, protocol segments to a destination in the network 108, retrieving protocol segments from some source in the network 108, and acknowledging their receipt. Similarly, the client computer 106 has a south side interface 144 between network layer 124 and connection-oriented protocol layer 128, and a north side interface 146 between connection-oriented protocol layer 128 and process layer 132. Note that the network layer 122 or 124 converts the protocol segments into packets suitable for transmission over the network 108, such as IP packets, before they are sent to a destination. If TCP is used, the unit of information passed through the south side interface 140 or 144 is a TCP segment.

In order to transfer data from a source process running on server computer 100 to a destination process running on client computer 106 via the network 108, the data is routed through the layers of server computer 100 to the network 108, through the network 108 to computer 106, and then through the layers of client computer 106 to the destination process. Using this framework 120, the network layer 124 of client computer 106 and the network layer 122 of server computer 100 are responsible for receiving and transmitting data over the network 108. Likewise, the connection-oriented protocol layer 128 of client computer 106 is responsible for routing data between the network layer 124 and the correct process running in the process layer 132. Similarly, the connection-oriented protocol layer 126 of server computer 100 is responsible for routing data between the network layer 122 and the correct process running in the process layer 130. In addition, the connection-oriented protocol layers 126 and 128 work together to ensure that data is delivered error-free, in the order it was sent, and without loss or duplication.

Connection-oriented protocols are designed to establish a connection with their peer, e.g., layer 126 to layer 128. Once the connection is established, normal communication may commence. When either peer is finished, the connection is terminated after any outstanding data is delivered. If one of the peers abnormally ends its participation, the connection is unilaterally terminated. Abnormal terminations are typically caused by a failure of a process running on one of the peers.

From the perspective of the server computer 100, there are two ways to tolerate failures of a process and then mask that failure from the client computer 106. First, the state of the process layer 130 can be maintained. Second, the state of the connection to the client process layer 132 can be maintained. The present invention focuses on the difficult task of maintaining the connection state. The connection state, however, is not readily accessible because the connection is typically part of the operating system and is a portion of code that typically should not be modified.

Now referring to FIGS. 3A and 3B, block diagrams of two computer architectures in accordance with the present invention are shown. The server computer 150 shown in FIG. 3A includes a network layer 152, a connection-oriented protocol layer 154 and a process layer 156. In addition, a south side interface 158 couples the network layer 152 to the connection-oriented protocol layer 154, and a north side interface 160 couples the connection-oriented protocol layer 154 to the process layer 156. A south side wrapper 162 is interposed in the south side interface 158. Similarly, a north side wrapper 164 is interposed in the north side interface 160.

The present invention allows a crashed process to keep its connections open until the process either recovers or is failed-over to a backup system. As a result, the processes connected to the crashed process do not detect any anomaly in the behavior of their connections and the failure and recovery of the crashed process are completely transparent. In order to maintain transparency between the connection-oriented protocol layer 154 and the failure and recovery of the crashed process within the process layer 156, the present invention employs a technique called wrapping. Wrapping interposes active software at all interfaces to a wrapped software component. In the context of the connection-oriented protocol layer 154 of the server computer 150, the south side wrapper 162 and the north side wrapper 164 wrap the connection-oriented protocol layer 154.

When an application or process within the process layer 156 of the server 150 would normally invoke an operation at the north side interface 160, that operation may be intercepted by the north side wrapper 164. The interposition code may choose to pass the operation directly through to the connection-oriented protocol layer 154, or it may modify the operation in some way, including processing the operation without the knowledge of the connection-oriented protocol layer 154. The same control flexibility is true for upcalls from the connection-oriented protocol layer 154 back up to the application or process within the process layer 156. Upcalls are typically the result of data availability to satisfy an outstanding read operation.

The interaction between the connection-oriented protocol layer 154 and the network layer 152 can be controlled in a similar fashion. Interposition at the south side wrapper 162 conveys the ability to intercept incoming protocol segments and either pass them through to the connection-oriented protocol layer 154, drop them, take actions on specific segments, such as a SYN or FIN, or modify fields of the protocol segment header before passing them up to the connection-oriented protocol layer 154. Protocol segments may also be manufactured (i.e. without having been received from any client) and passed up to the connection-oriented protocol layer 154. The south side wrapper can intercept outgoing protocol segments and perform the same types of control manipulation.

The embodiment of the present invention described in reference to FIG. 3A uses wrapping to avoid modification of the connection-oriented protocol layer 154 in server computer 150. While this is a preferred embodiment, it is not necessary for the successful implementation of the present invention. For example, FIG. 3B illustrates an alternative embodiment of the present invention wherein the connection-oriented protocol layer 174 in server computer 170 is modified to provide the same functionality described above in reference to FIG. 3A.

The server computer 170 includes a network layer 172, a connection-oriented protocol layer 174 and a process layer 176. In addition, a south side interface 178 couples the network layer 172 to the connection-oriented protocol layer 174, and a north side interface 180 couples the connection-oriented protocol layer 174 to the process layer 176. A south side wrapper 182 is interposed in the connection-oriented protocol layer 174. Similarly, a north side wrapper 184 is interposed in the connection-oriented protocol layer 174. The functions of the south side wrapper 182 and north side wrapper 184 may be integrated into the connection-oriented protocol layer 174 to such an extent that they are inseparable and indistinguishable from the connection-oriented protocol layer 174.

The layered architectures shown in FIGS. 3A and 3B mask the failure of a server computer from the client computer. Thus, the present invention provides transparency to the connection-oriented protocol layer on the server computer and to the client computer during the failure and recovery of processes on the server computer. Moreover, there is no need to interpose a proxy or intermediary between the client computer and the server computer. This mode of fault tolerance is implemented without any modifications to: (1) the client computer; (2) the processes running on the client computer; (3) the processes running on the server computer; and (4) the connection-oriented protocol used at either the server computer or the client computer. Moreover, the fault tolerance provided by the present invention can be implemented on a selective basis within a computer. In other words, a computer could have some connections that are rendered fault tolerant by the present invention and at the same time have other connections that are not fault tolerant.

As previously described, the present invention maintains the client computer's view of the operation of the connection-oriented protocol even in the face of process failures within the server computer. Thus, the present invention not only addresses the resiliency of the process running on the server computer and its state, but also the state of the ongoing connection with the processes' set of clients.

With respect to process level resiliency, the present invention can provide various levels of recovery with respect to the extent or length of the connection interaction that may be required to be "replayed" to bring the process on the server computer up to a state that is consistent with the process on the client computer. For example, at one end of the spectrum, a server process may be required to exhibit a deterministic execution relative to each connection. In other words, recovery of the server process would start the process from its initial state and replay its entire execution sequence relative to each client that it is interacting with. At an intermediate point in the spectrum, the server process may perform periodic checkpoints of the application state. In this case, recovery of the server process would start the process from its latest checkpoint and only replay the execution sequence past that checkpoint. At the other end of the spectrum, active replication techniques and/or primary/active backup systems would recover the server process using a backup whose state is already up to date and where only the most recent interaction might have to be replayed.

From the perspective of the ongoing connection with the processes' set of clients, the worst case is the first case presented above, wherein all data from the client to the server must be replayed at the server during recovery in order to drive the server back to a state consistent with the client. Although this case is assumed in the following discussion, the present invention is not limited to this case. Accordingly, the second and third cases described above would allow the present invention to further optimize the recovery process by garbage collecting more aggressively information that will never be used during replay. Regardless of the case used, however, after a failure and recovery, the server process must be able to resume ongoing communication with a client process in a manner consistent with all communication that preceded the failure.

The present invention uses several properties to uphold the fundamental properties of the connection-oriented protocol in a way that is transparent to, or masked from a client. These properties are defined relative to the client computer's view where p represents some byte offset in the data stream from the client to the server.

sent(p): the byte at byte offset p has been transmitted in a TCP segment from the client to the server.

received(p): the byte at byte offset p has been received from the network and is on the server machine.

acked(p): the byte at byte offset p has been acknowledged through the receipt at the client of a TCP segment with the ACK bit sent and an acknowledged sequence number that at least includes p.

The client computer knows the truth of sent(p) and of acked(p) since these are directly visible to the connection-oriented protocol layer at the client computer. The same is not true for received(p). The client computer knows that data that is sent should eventually be received, but received(p) is not directly observable by the client computer. The client computer does know, however, that once data has been acknowledged, it must have been received. Thus, $$acked(p) \rightarrow received(p) \rightarrow sent(p).$$

Data that is being sent in the data stream from the client computer to the server computer evolves through a number of life cycle phases. The data may be:

pre-natal: the data has not yet been generated.

childhood: the data has been generated, but has not been passed through the north side interface to the connection-oriented protocol layer. This data resides in data buffers in the application.

adolescence: the data has been passed through a write operation at the north side interface to the connection-oriented protocol layer. Depending on the nature of the write, the data may reside in data buffers managed by the connection-oriented protocol layer or still in application buffers, provided the client application is not allowed to modify those buffers.

maturity: the data resides in one or more protocol segments managed by the connection-oriented-protocol layer that are available for retransmission because they have not yet been acknowledged.

death: the data no longer resides in buffers managed by the connection-oriented-protocol layer because it has been acknowledged and those buffers have been reclaimed. The data may not be available in client application buffers either, since the north side interface has accepted responsibility for the transport of the data.

Note that even if the data still resided in client application buffers, there is no interface at north side interface for a connection-oriented layer to "rerequest" the data.

To capture this notion that only a subrange of the data bytes in the byte stream are available to the connection-oriented protocol layer at the client computer at any given time, the predicate available(p) is defined as follows:

$$\text{available}(p) \equiv \text{sent}(p)^{\wedge} - \text{acked}(p).$$

In addition to data in the byte stream, the fault tolerant implementation of the present invention may affect the timing of communications between the client and the server. Since most connection-oriented protocols, such as TCP, define a round trip time that is used in calculating the retransmission timeout. The function time takes a predicate as an argument and returns the earliest time at which the predicate becomes true. The round trip time ("RTT") of the byte at byte offset p can be defined as:

$$RTT = \text{time } (\text{acked}(p)) - \text{time}(\text{sent}(p)).$$

Each connection-oriented protocol layer should implement an algorithm to adapt the timeout values to be used for the round trip time of the segments. To do this, the connection-oriented protocol records the time at which a segment was sent, and the time at which the acknowledgment is received. A weighted average is calculated over several of these round trip times, to be used as a timeout value for the next segment(s) to be sent. This is an important feature, since delays may be variable on an internet, depending on multiple factors, such as the load of an intermediate low-speed network or the saturation of an intermediate IP gateway.

Typically, client applications and their connection-oriented protocols depend on the assumption that the server computer will not fail so that they can discard data that has been acknowledged and thus make the data unavailable. More specifically, the connection-oriented protocol layer at the client computer is actually assuming that once data is received by the connection-oriented protocol layer at the server computer, the data is stable there for use by the server application and no longer needs to be available at the client computer. This behavior can be represented by an additional predicate:

stable(p): the byte at byte offset p has been received at the server computer and is guaranteed to never be lost.

As noted above, if the server computer never fails, then stable(p)≡received(p), and incorporating the previous expressions:

$$\text{acked}(p) \rightarrow \text{stable}(p) \equiv \text{received}(p) \rightarrow \text{sent}(p).$$

Since server computers may fail, data that has been received at the server computer may not be stable. There is necessarily some additional activity that must be taken to take data that has been received and to make it stable. Thus, $$\text{stable}(p) \rightarrow \text{received } (p).$$

To solve the potential problem of data required for recovery of the server application that may no longer be available at the client computer without modifying the client computer, all bytes in the stream that are acknowledged should be made stable first, i.e. acked(p)→stable(p). So one goal of the present invention is to maintain the invariant:

$$\text{acked}(p) \rightarrow \text{stable}(p) \rightarrow \text{received}(p) \rightarrow \text{sent}(p)$$

in a way that is both transparent to the client computer and to the connection-oriented protocol layer at the server. Thus, the present invention provides mechanisms to make bytes in the data stream that may be needed by a recovering server application stable across failures, and only allow acknowledgment of bytes in the data stream that are already stable.

Based on the previous discussion, the present invention uses two components to achieve fault tolerance: (1) the logic within the north side wrapper and the south side wrapper resident on the computer whose connections are being made fault tolerant; and (2) the logic and code that create stable storage. There are many possible ways to implement a version of stable storage to satisfy the requirements of the present invention. These implementations vary by both performance characteristics as well as the classes of failures that they support. They also may be related to the solution chosen for providing server application fault tolerance discussed above.

Figure 4A:
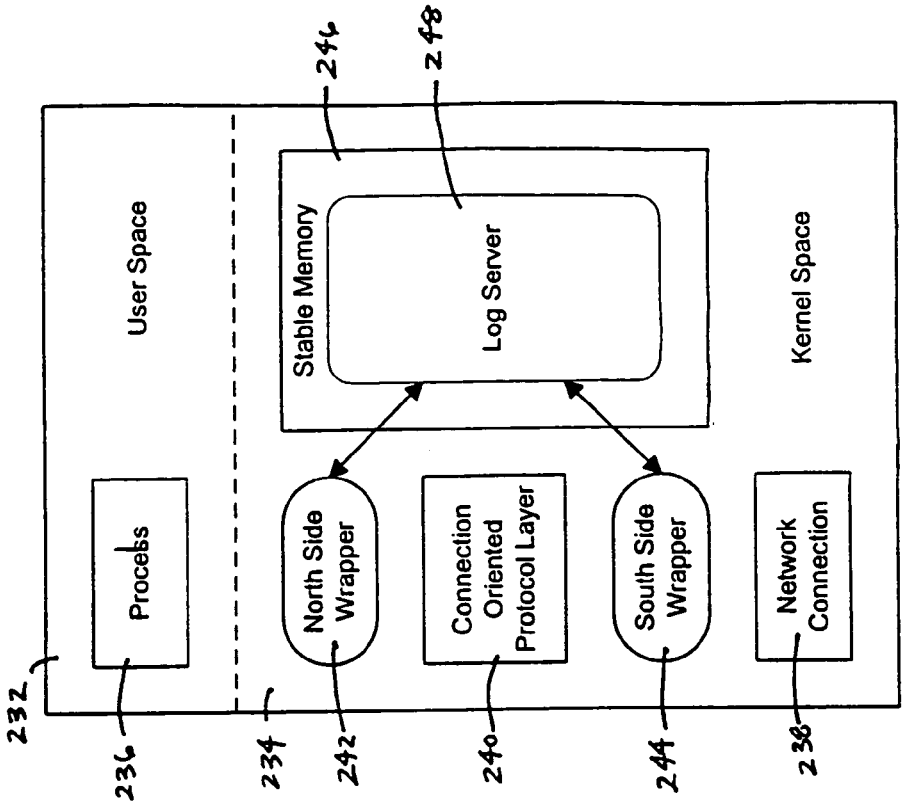
FIGS. 4A, 4B and 4C are block diagrams of three embodiments of a log server in accordance with the present invention.
Figure 4B:
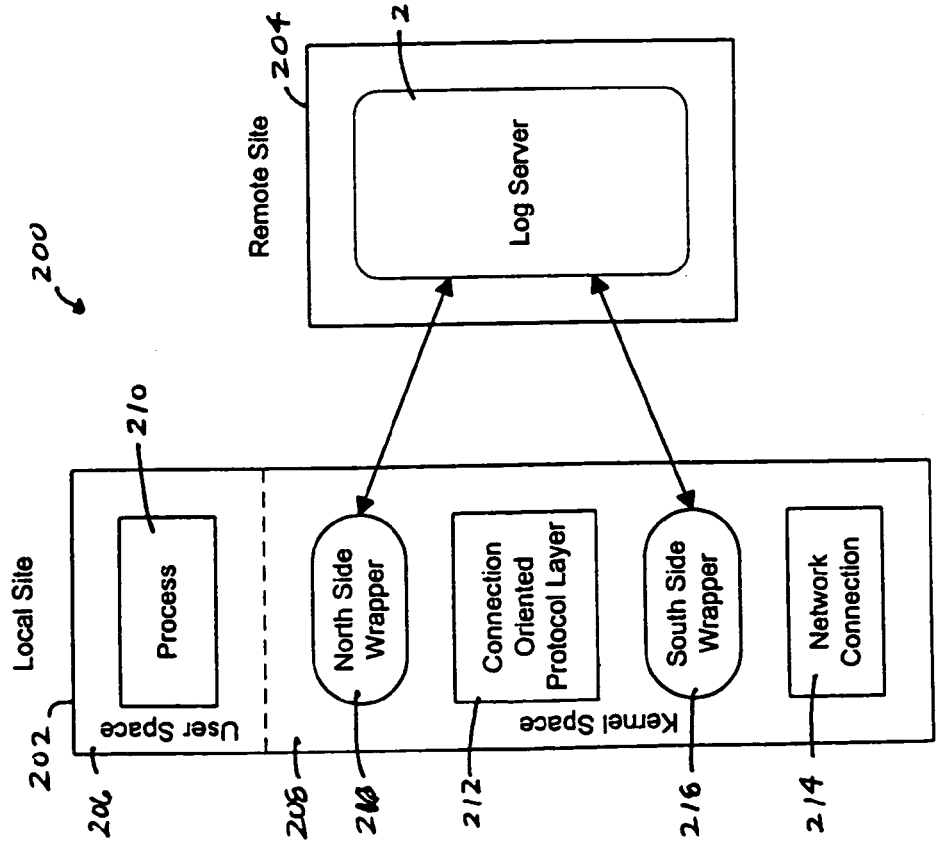
Figure 4C:
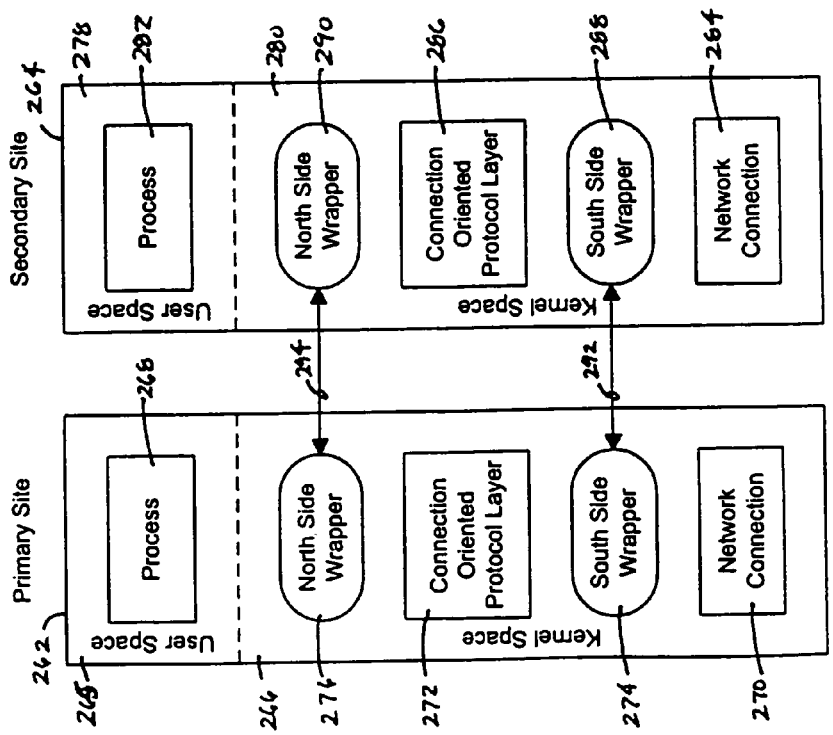

Accordingly, FIGS. 4A, 4B and 4C illustrate three alternative implementation of the present invention. All of the alternatives can use a common interface, so the protocol description to follow is independent of the choice for stable storage realization. The interface between the north and south side wrappers and the component realizing stable storage should provide:

(1) Logging of per-connection meta-data.
(2) Logging of protocol segments for data for a given connection.
(3) Notification when prior logging operations have been received by the stable storage component. This as a stability upcall since it is asynchronous to the other activity at the primary server site.
(4) Garbage collection interface whereby all protocol segment data through a given sequence number may be discarded.

Referring now to FIG. 4A, a first embodiment of the present invention 200 having a local site 202 and a remote site 204 providing stable storage is shown. The local site 202 includes a user space 206 and a kernel space 208. The user space 206 has a process 210. The kernel space 208 has a connection-oriented protocol layer 212 and a network connection 214. In addition, a north side wrapper 216 couples the connection-oriented protocol layer 212 with the process 210, and a south side wrapper 218 couples the connection-oriented protocol layer 212 with the network connection 214.

The remote site 204 includes a log server 220 that provides the stable storage. The log server 220 is coupled to both the north side wrapper 216 and the south side wrapper 218. Since the log server 220 is remotely located, a relatively constant delay will be added to the RTT. Although this delay will add to the latency at the application, it will not hurt throughput (except for needing larger window sizes for in-channel data).

Now referring to FIG. 4B, a second embodiment of the present invention having a computer 230 providing stable storage is shown. The computer 230 includes a user space 232 and a kernel space 234. The user space 232 has a process 236. The kernel space 234 has a connection-oriented protocol layer 240, a network connection 238, and a stable storage 246. In addition, a north side wrapper 242 couples the connection-oriented protocol layer 240 with the process 236, and a south side wrapper 244 couples the connection-oriented protocol layer 240 with the network connection 238. The stable memory 246 includes a log server 248 that is coupled to both the north side wrapper 242 and the south side wrapper 244.

Referring now to FIG. 4C, a third embodiment of the present invention 260 uses a replicated application server with primary 262 and backup 264 instances to provide stable storage. The primary site 262 includes a user space 265 and a kernel space 266. The user space 265 has a process 268. The kernel space 266 has a connection-oriented protocol layer 272 and a network connection 270. In addition, a north side wrapper 276 couples the connection-oriented protocol layer 272 with the process 268, and a south side wrapper 274 couples the connection-oriented protocol layer 272 with the network connection 270. Similarly, the secondary site 264 includes a user space 278 and a kernel space 280. The user space 278 has a process 282. The kernel space 280 has a connection-oriented protocol layer 286 and a network connection 284. In addition, a north side wrapper 290 couples the connection-oriented protocol layer 286 with the process 282, and a south side wrapper 288 couples the connection-oriented protocol layer 286 with the network connection 284. Furthermore, the south side wrapper 274 of the primary site 262 is coupled to the south side wrapper 288 of the secondary site 264 via communication link 292. Similarly, the north side wrapper 276 of the primary site 262 is coupled to the north side wrapper 290 of the secondary site 264 via communication link 294.

The third embodiment of the present invention 260 replicates the server application process 268 on the secondary or failure independent site 264 as process 282. This secondary site 264 can be used to realize stable storage. Since the application process 268 is already replicated, the protocol segment data can be processed in this environment by replicating the connection-oriented protocol layer 272 at the secondary site 264 as connection-oriented protocol layer 286. The secondary site 264 would then receive protocol segments that are to be made stable at the primary site 262.

One embodiment of the present invention will now be described in conjunction with a specific connection-oriented protocol, TCP. As will be appreciated by those skilled in the art, the architecture of the present invention is applicable to other connection-oriented network protocols, such a SS7, IPX, NetWare and SS7. In the basic data-transfer process, a transport user such as File Transfer Protocol ("FTP") passes data to a TCP transport, which encapsulates the data into a segment that contains user data and control information (e.g., the destination address). TCP ensures reliable data delivery by numbering outgoing segments sequentially and then having the destination TCP module acknowledge arrival of the segments by number. If segments arrive out of order, they can be reordered via sequence numbers, and if a segment fails to arrive, the destination TCP module will not acknowledge its receipt, so that the sending TCP module will resend it.

The following definitions are TCP segment window elements relative to the knowledge that the TCP Failover code has, including north side wrapper and south side wrapper and, indirectly, from the log server. The following are all for the window on the instream (client to server).

(1) delivered: Octets delivered via reads to application software running above the north side wrapper.
(2) complete: Octets received and acknowledged (Invariant: complete≦stable).
(3) received: Largest non-gap prefix received.
(4) stable: Largest non-gap prefix stable on log server.
(5) high: Highest sequence number received.
(6) top: Advertised window size.

Figure 5:
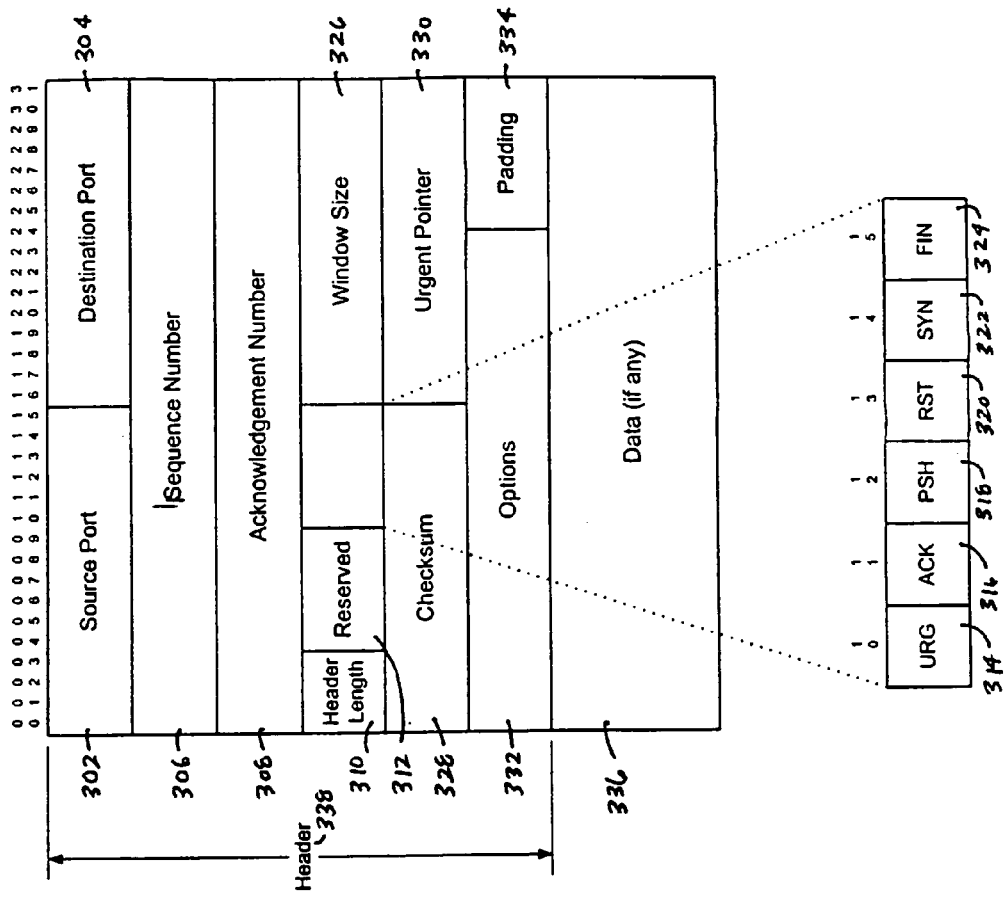
FIG. 5 illustrates the structure of a prior art Transmission Control Protocol segment.

Now referring to FIG. 5, the format of a TCP segment 300 is illustrated. The TCP segment 300 is a packet containing a variable number of 32-bit words. The TCP segment 300 is divided into a number of fields or elements, such as a source port field 302, destination port field 304, sequence number field 306, acknowledgment number field 308, header length field 310, reserved field 312, urgent (URG) control bit 314, acknowledgment (ACK) control bit 316, push (PSH) control bit 318, reset (RST) control bit 320, synchronize (SYN) control bit 322, finish (FIN) control bit 324, window size field 326, checksum field 328, urgent pointer field 330, options field 332 and padding 334. The TCP segment 300 may or may not include data 336.

The 16-bit source port field 302 contains the port number assigned to the source process and is used by the receiving process to address replies. The 16-bit destination port field 304 contains the port number assigned to the destination process and is used by TCP to route the segment to the proper process. The sequence number field 306 contains the sequence number of the first data byte in the TCP segment 300. If, however, the SYN control bit 322 is set, the sequence number field 306 contains the initial sequence number (ISN) and the first data byte is ISN+1. The acknowledgment number field 308 contains the value of the next sequence number that the receiving TCP Layer is expecting to receive.

The header length field 310 contains the number of 32-bit words in the TCP header and thus indicates where the data 336 begins. The 6-bit reserved field 312 is reserved for future use and must be zero. The URG control bit 314 indicates that the urgent pointer field 330 is significant in the TCP segment 300. The ACK control bit 316 indicates that the acknowledgment field 308 is significant in the TCP segment 300. The PSH control bit 318 indicates a Push function. The RST control bit 320 resets the connection. The SYN control bit 322 synchronizes the sequence numbers. The FIN control bit 324 indicates that no more data from sender will be sent. The window field 326 is used when the acknowledgment control bit 316 is set to specify the number of data bytes beginning with the one indicated in the acknowledgment number field 308 which the receiver (the sender of this segment) is willing to accept.

The 16-bit checksum field 328 contains the 16-bit one's complement of the one's complement sum of all 16-bit words in a pseudo-header, the TCP header 338 and the TCP data 336. The checksum field 328 itself is considered zero while the checksum is computed. The urgent pointer field 330 contains a pointer to the first data octet following the urgent data. This field is only significant when the URG control bit 314 is set. The options field 332 may contain a single byte containing the option number, or a variable length option. For example, a maximum segment size option is only used during the establishment of the connection (SYN control bit 322 set) and is sent from the side that is to receive data to indicate the maximum segment length it can handle. If this option is not used, any segment size is allowed. The padding 334 is filled with zeros to ensure that the TCP header 338 ends and the data 336 begins on a 32-bit boundary.

Figure 6:
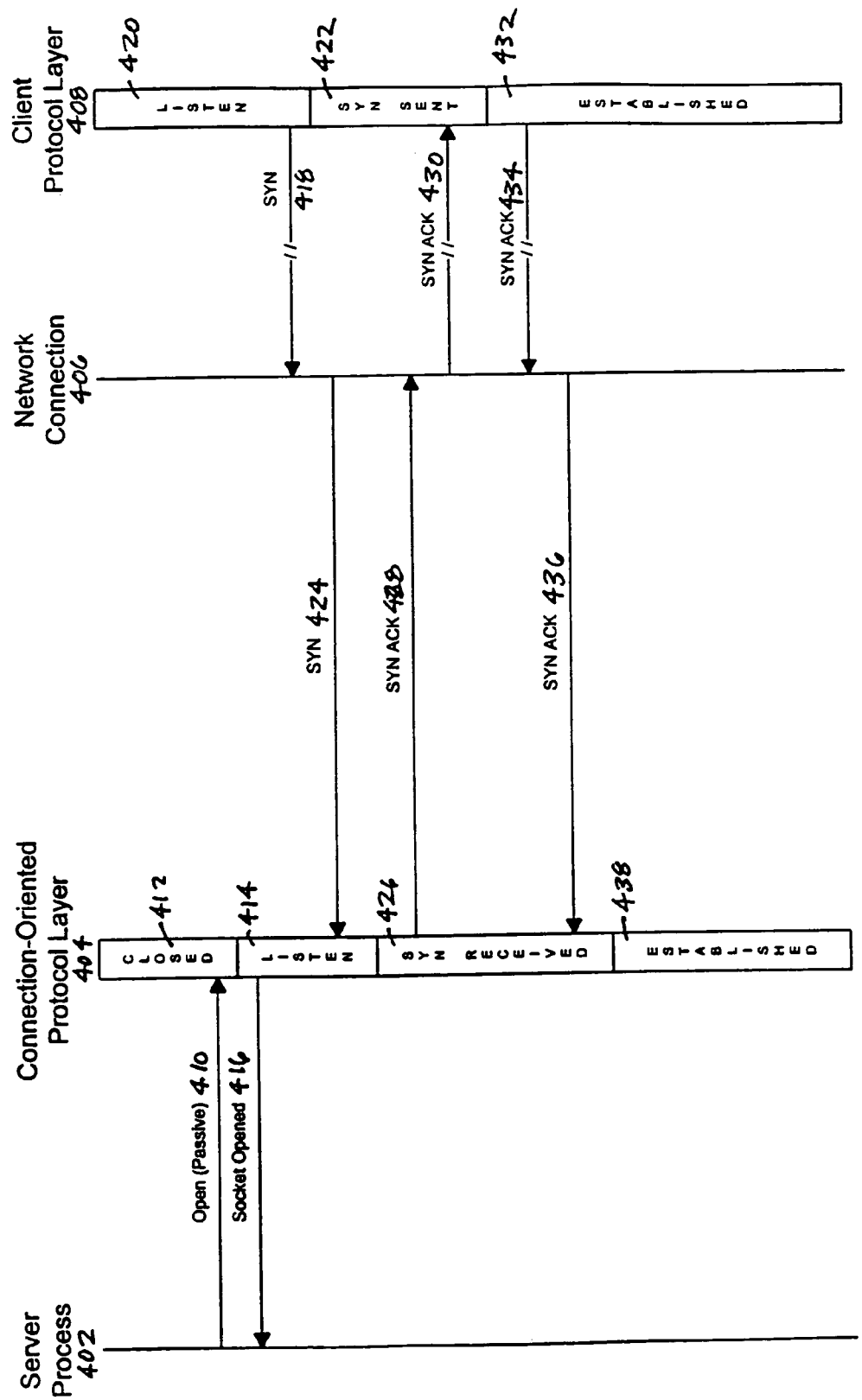
FIG. 6 depicts a TCP client-server session initiation sequence in accordance with the prior art.

Referring now to FIG. 6, the TCP client-server session initiation process in accordance with the prior art is shown. The server includes a server process 402, a connection-oriented protocol layer 404 and a network connection 406. Similarly, the client includes a client process (not shown), a client protocol layer 408 and a client network connection (not shown). In order to simplify the drawing, the client process and client network connection are not shown. Before any data can be transferred, a connection has to be established between the client and the server. The server process 402 issues a passive open call 410 to the connection-oriented protocol layer 404 which is in a closed mode 412. The connection-oriented protocol layer 404 responds by establishing a TCP port, which is used to identify the server process 402 as being available for connection with a client, and changing to a listen mode 414. The connection-oriented protocol layer 404 then sends a socket opened message 416 to the server process 402 and waits for a client to request a connection to the server process 402.

A client that wants to connects to the server process 402 instructs the client protocol layer 408 to send a SYN segment 418, which includes the IP address and port of the server and causes the client protocol layer 408 to change from listen mode 420 to syn sent mode 422. Note that the // in FIGS. 6–23 indicate that the client network connection and network are not illustrated. The SYN segment 418 is the first message of what is known as the three-way connection handshake. The SYN segment 418 is identified by setting the SYN bit 322 (FIG. 5) in the options portion of the TCP header 338 (FIG. 5) for the segment 300 (FIG. 5). The SYN segment 418 also specifies an initial sequence number ("ISN") 306 to be used for the client to server inbound byte stream. In TCP, sequence numbers are used to specify, relative to the ISN, the byte offset in the stream. Once the network connection 406 of the server receives the SYN segment 418, it removes the IP encapsulation and sends a TCP SYN segment 424 to the connection-oriented protocol layer 404.

The connection-oriented protocol layer 404 then changes to a syn received mode 426 and sends a SYN-ACK segment 428, which represents the second message in the handshake, to the network connection 406. The SYN-ACK segment 428 has both the SYN bit 322 (FIG. 5) set, for the server's wish to synchronize sequence numbers and establish a connection, and the ACK bit 316 (FIG. 5) set, acknowledging the client's ISN. The SYN-ACK segment 428 also specifies the ISN for the server to client outbound byte stream. The network connection 406 then encapsulates the SYN-ACK segment 428 with the necessary IP information and sends SYN-ACK segment 430 to the client protocol layer 408.

After the client protocol layer 408 receives the TCP version of the SYN-ACK segment 430, the client protocol layer 408 changes to a connection established state 432 and sends the last segment in the handshake, which is SYN-ACK segment 434 that acknowledges the server's ISN. Once the server's network connection 406 receives the SYN-ACK segment 434, it removes the IP information and sends the TCP SYN-ACK segment 436 to the connection-oriented protocol layer 404. When the connection-oriented protocol layer 404 receives the TCP SYN-ACK segment 436, it changes to a connection established state 438, which completes session initiation process. The client and server are now configured to exchange data.

As previously described, the TCP timeout mechanism, whereby the protocol determines when to retransmit a segment for which it has not received an acknowledgment, is based on a calculation of the round trip time ("RTT"). Both the client and the server independently calculate their own local view of the RTT. This calculation is initially performed during connection establishment by measuring the time from the send of the SYN segment 418 to the receipt of the SYN-ACK segment 430 at the client and measuring the time from the send of the SYN-ACK segment 428 to the receipt of the final handshake SYN-ACK segment 436 at the server. After being set initially, the RTT continues to be updated through normal communication.

In addition, TCP provides flow control by advertising a window size. The window size is the amount of data the TCP is willing to accept and corresponds to the amount of buffer space available at the receiver. The window size is also initially exchanged during the connection establishment and is then updated through normal communication. The window size is at its largest at this point.

Once a connection is established, normal communication may commence. Now referring to FIGS. 7, 8 and 9, various normal communications between the client and server are shown. TCP provides full duplex communication, so communication activity in one direction is independent of communication activity in the other direction. Normal communication is driven by send 452 (FIG. 9) and receive 440 (FIG. 7) operations from the application or server process 402 to TCP or the connection-oriented protocol layer 404 through the north side interface.

Now referring to FIG. 7, a receive operation 440 from the server process 402 informs the connection-oriented protocol layer 404 that the application is ready for incoming data. As data segments 442 are received from the client protocol layer 408 by the server network connection 406, the corresponding TCP data segments 444 are sent to the connection-oriented protocol layer 404. The connection-oriented protocol layer 404 converts the TCP data segments 444 into contiguous application data 446 and passed through the north side interface into the buffer for the server process 402.

Referring now to FIG. 8, after receipt of a data segment, such as 444 (FIG. 7), at the connection-oriented protocol layer 404, an ACK segment 448 is sent to the network connection 406 which in turn sends the ACK segment 450 to the client protocol layer 408. The acknowledgment is omitted if there is a gap between the data it was expecting and that which the segment contained. At the discretion of TCP, the acknowledgment may be delayed and or piggy-backed on outgoing data.

Now referring to FIG. 9, a send operation 452 from the server process 402 to the connection-oriented protocol layer 404 is transformed into the transmission of one or more TCP segments between TCP peers. When a segment is transmitted, it specifies the sequence number of the start of the data contained in the segment and the length of the segment data. When a segment is acknowledged, the acknowledgment specifies the sequence number expected on the next segment, implicitly acknowledging the receipt of all data up to the specified sequence number. As illustrated, the ACK+ Data segment 454 is sent from the connection-oriented protocol layer 404 to the network connection 406. The ACK+Data segment 456 is then sent to the client protocol layer 408.

Whenever a segment is transmitted, TCP starts a timer based on the RTT. If the segment is not acknowledged before the timer expiration, the segment is retransmitted. A fixed number of retransmissions are attempted before the connection is deemed faulty. If a segment gets lost or corrupted, the receiver will acknowledge all further well-received segments with an acknowledgment referring to the first byte of the missing packet. The sender will stop transmitting when it has sent all the bytes in the window. Eventually, a timeout will occur and the missing segment will be retransmitted.

Figure 10:
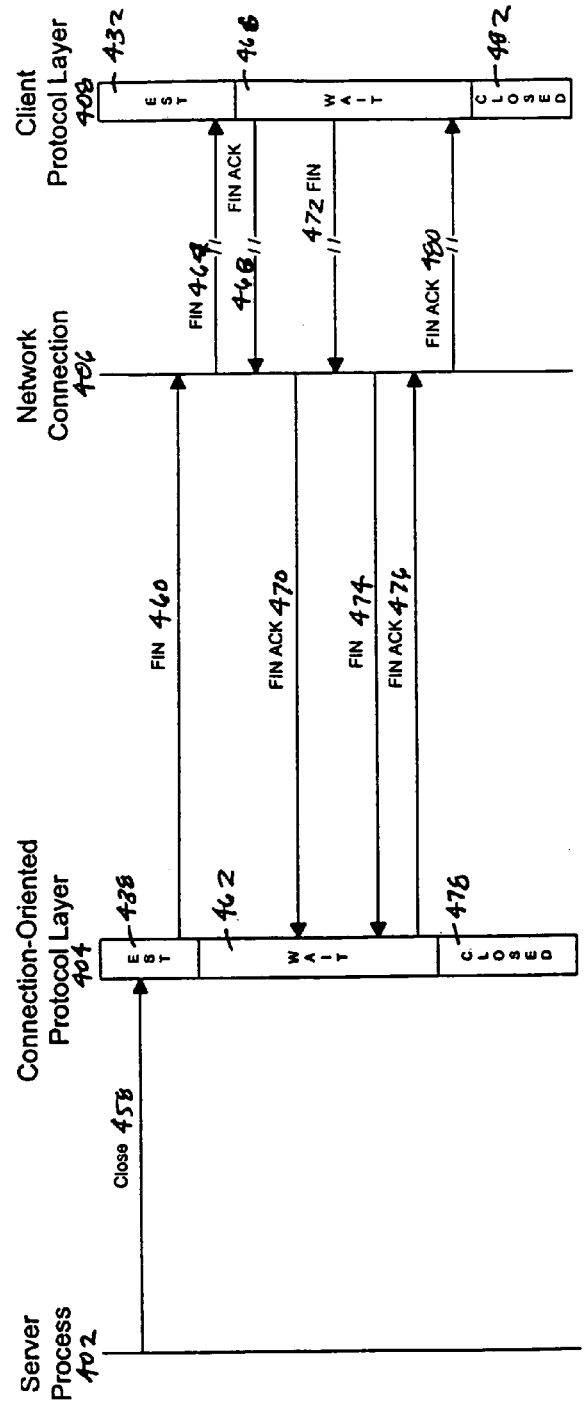
FIG. 10 depicts a TCP process initiated normal close sequence in accordance with the prior art.

Referring now to FIG. 10, a normal close session, which may be initiated by either the client or the server, is shown. The server process initiates the close operation 458 via the connection-oriented protocol layer 404, which sends a FIN segment 460, which is done by sending a TCP segment with the FIN bit 324 (FIG. 5) (no more data) set, to the server network connection 406 and changes to a wait mode 462. After the client protocol layer 408 receives the FIN segment 464, it changes to a wait mode 466 and sends a FIN-ACK segment 468 to the server network connection 406. The connection-oriented protocol layer 404 receives the FIN-ACK segment 470 and continues to wait. As the connection is full-duplex (that is, we have two independent data streams, one in each direction), the FIN segment only closes the data transfer in one direction. The other process will now send the remaining data it still has to transmit and also ends with a TCP segment where the FIN bit is set. The connection is deleted (status information on both sides) once the data stream is closed in both directions. Once the client receives all the data, the client protocol layer 408 sends a FIN segment 472 to the server network connection 406, which sends FIN segment 474 to the connection-oriented protocol layer 404. The connection-oriented protocol layer 404 then sends a FIN-ACK segment 476 to the network connection 406 and changes to a closed mode 478. The network connection 406 sends FIN-ACK segment 480 to the client protocol layer 408, which then changes to a closed mode 482.

Figure 11:
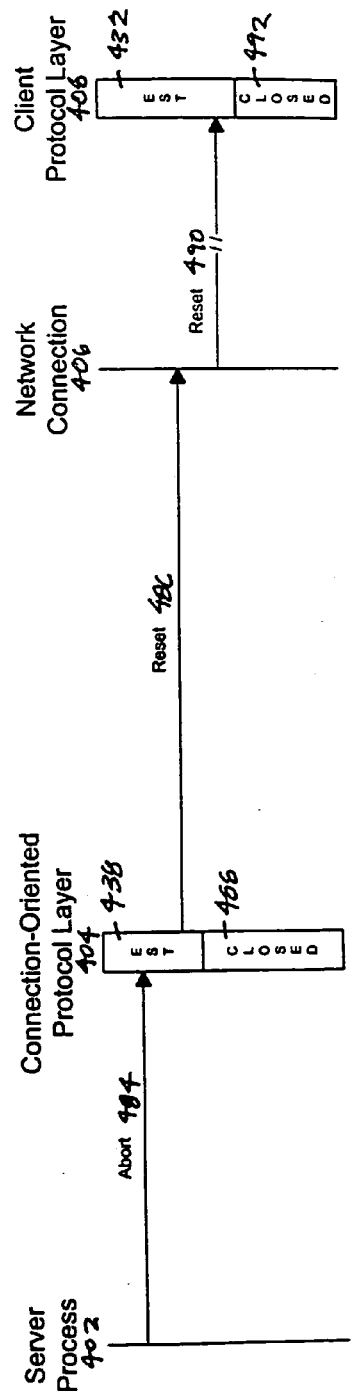
FIG. 11 depicts a TCP process initiated abnormal close sequence in accordance with the prior art.

Now referring to FIG. 11, an abnormal connection termination, which may be in response to a number of different conditions, is shown. During an abnormal termination, all undelivered data associated with the connection is discarded. An abort operation 484 from the server process 402 initiates such an abortive release. Other conditions include exceeding the retry limit for retransmissions due to timeout, a connection request to a nonexistent port, and in general TCP segments that do not appear correct for the referenced connection.

The TCP segment identifying an abortive release is called the RST segment. It is identified by setting the RST bit 320 (FIG. 5) in the options portion of the TCP header 338 (FIG. 5) for the segment. For the cases of an application initiated abort, or excessive retransmission, the RST segment is sent to the known peer of the connection. In the other cases, a connection was never established and the RST segment is returned to the source of the anomaly. After receipt of the abort operation 484, the connection-oriented protocol layer 404 sends a RST segment 486 to the network connection 406 and changes to a closed mode 488. The network connection 406 sends a RST segment 490 to the client protocol layer 408, which in turn changes to a closed mode 492.

Figure 12:
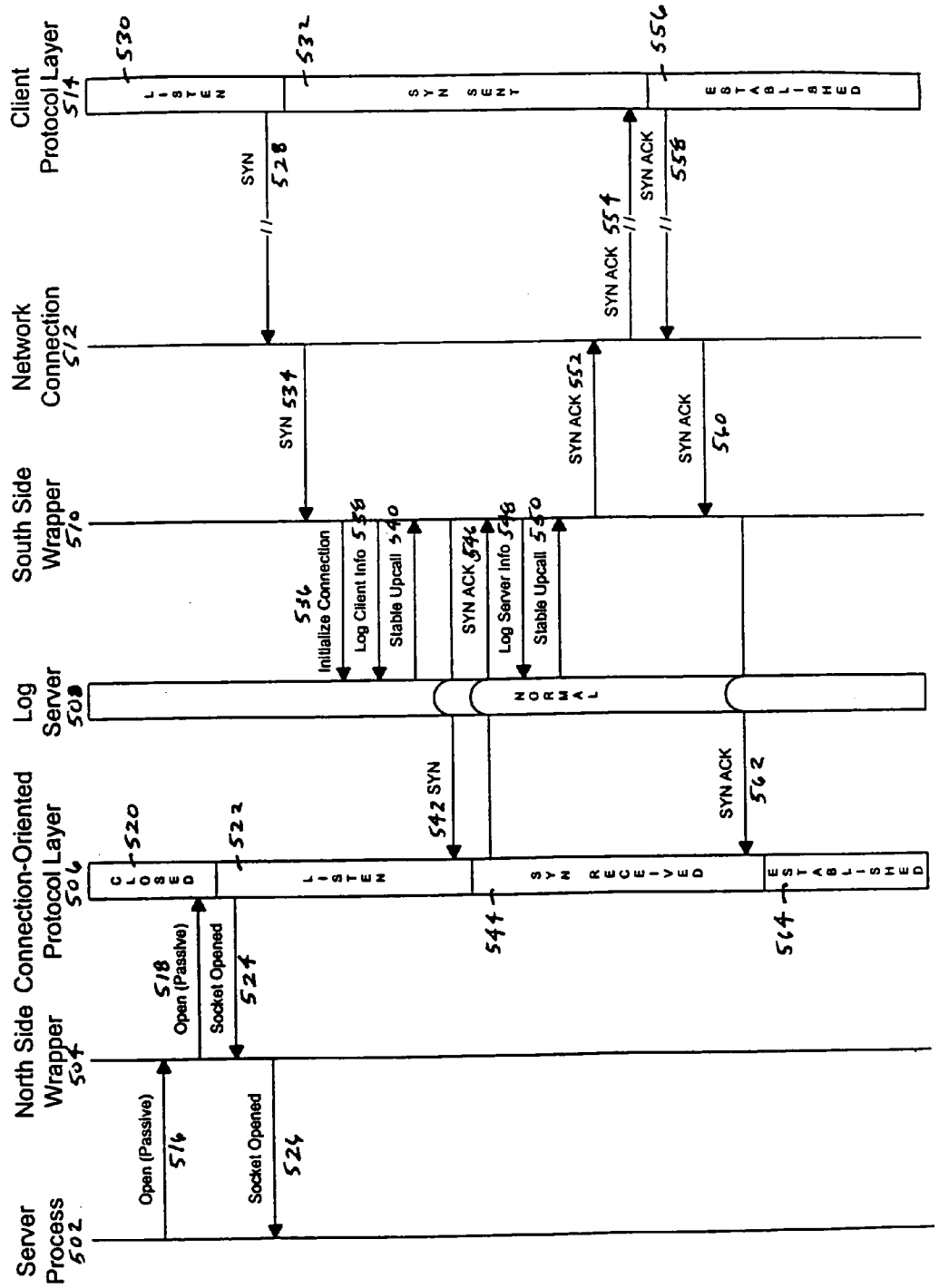
FIG. 12 depicts a TCP client-server session initiation sequence in accordance with one embodiment of the present invention.

Referring now to FIG. 12, the TCP client-server session initiation process in accordance with one embodiment of the present invention is shown. The server includes a server process 502, a north side wrapper 504, a connection-oriented protocol layer 506, a log server 508, a south side wrapper 510 and a network connection 512. Similarly, the client includes a client process (not shown), a client protocol layer 514 and a client network connection (not shown). In order to simplify the drawing, the client process and client network connection are not shown. Before any data can be transferred, a connection has to be established between the client and the server. The server process 502 issues a passive open call 516 to the north side wrapper 504, which sends a passive open call 518 to the connection-oriented protocol layer 506 which is in a closed mode 520. The connection-oriented protocol layer 506 responds by establishing a TCP port, which is used to identify the server process 502 as being available for connection with a client, and changing to a listen mode 522. The connection-oriented protocol layer 506 then sends a socket opened message 524 to the north side wrapper 504, which sends a socket opened message 526 to the server process 502 and waits for a client to request a connection to the server process 502.

A client that wants to connects to the server process 502 instructs the client protocol layer 514 to send a SYN segment 528, which includes the IP address and port of the server and causes the client protocol layer 506 to change from listen mode 530 to syn sent mode 532. The SYN segment 528 is the first message of what is known as the three-way connection handshake. Once the network connection 512 of the server receives the SYN segment 534, it removes the IP encapsulation and sends an initialize connection message 536 and logs client information 538 to the log server 508. Once the data is stable, the log server 508 sends a stable upcall 540 to the south side wrapper 510, which in turn sends a SYN segment 542 to the connection-oriented protocol layer 506.

The connection-oriented protocol layer 506 then changes to a syn received mode 544 and sends a SYN-ACK segment 546, which represents the second message in the handshake, to the south side wrapper 510. The south side wrapper 510 then sends server information 548 to the log server 508, which sends a stable upcall 550 when the server information 548 is stored in stable storage. The network connection 512 then encapsulates the SYN-ACK segment 552 with the necessary IP information and sends SYN-ACK segment 554 to the client protocol layer 514.

After the client protocol layer 514 receives the TCP version of the SYN-ACK segment 554, the client protocol layer 514 changes to a connection established state 556 and sends the last segment in the handshake, which is SYN-ACK segment 558 that acknowledges the server's ISN. Once the server's network connection 512 receives the SYN-ACK segment 558, it removes the IP information and sends the TCP SYN-ACK segment 560 to the south side wrapper 510, which then sends the SYN-ACK segment 562 to the connection-oriented protocol layer 506. When the connection-oriented protocol layer 506 receives the TCP SYN-ACK segment 562, it changes to a connection established state 564, which completes session initiation process. The client and server are now configured to exchange data.

Once a connection is established, normal communication may commence. Now referring to FIGS. 13, 14 and 15, various normal communications between the client and server are shown. Normal communication is driven by send 590 (FIG. 15) and receive 566 (FIG. 13) operations from the application or server process 502 to TCP or the connection-oriented protocol layer 506 through the north side interface.

Incoming TCP segments are intercepted at the south side wrapper 510. Responsibilities at this entry point include updating received and high if the segment contains any new data. A segment that contains data not stable at the log server 508 is passed to the log server 508. Finally, the segment is passed up to the connection-oriented protocol layer 506.

If the incoming TCP segment is called segment, the sequence number of the incoming segment can be referred to as segment.seq_num, and the length in octets of the data portion of the incoming segment as segment.length. Note that segment.length is not an explicit field in the TCP header, instead it must be calculated based on the IP packet length after subtracting off the IP header and TCP header. The psuedocode is as follows:

```
if(segment_seq-num+segment.length−1)>high
  high:=segment.seq-num+segment.length−1;
}
if (segment.seq-num<=received+1)
received:=max    (received,    segment.seq_num+seg-
    ment.length−1);
}
// the log server has the up-to-date value for stable and
// logs only the bytes that exceed stable
if(segment.seq_num<=stable+1 &&
  segment.seq_num+segment.length−1>stable){
    request:=log_instream(segment.seq_num,    seg-
      ment.length, segment data);
}
TCP_Transport_Incoming_Segment(segment);
```

The north side wrapper 504 is responsible for intercepting both read requests coming from the server process 502, and completions of those reads initiated by the connection-oriented protocol layer 506 and destined for the server process 502. The north side wrapper 504 can deliver data that is not yet stable. The south side wrapper 510 cannot, however, acknowledge a sequence number that is not stable. This allows a server to repeat data destined for the client during recovery. It is safe for the server process 502 to consume data that has not yet been made stable. On recovery, the "new" server process will read up to stable, and then will wait for the client to provide again the lost data, according to the TCP protocols specification. It is also possible for the client to see the response to a message it sent to the server, without seeing acknowledgements for all the packets that composed the response. This is allowed since the TCP stack on the client side knows nothing about the contents of each request as it is split into packets and the client process does not see the partitioning of its write into packets.

Responsibilities on completion of a north side wrapper 504 read include updating delivered, and logging the read operation to the log server 508. The following psuedocode lets the information returned by the read completion be called completion.

delivered:=delivered+completion.length;

log_operation(read, performed_completion, completion offset, completion.length);

When the log server 508 has received a new instream segment and the segment is stable, it sends asynchronous notification to the TCP Failover code (or in general, the source of the segment to be logged). This results in invocation of the Stability Notification Upcall registered at the log server 508 interface at initialization time.

Responsibilities at the stability notification upcall include updating stable and, if necessary, transmitting a new acknowledgment. In the following psuedocode, stable-not denotes the stability notification; it includes the request number, the offset, and the sequence number of the last octet considered stable.

stable:=stable-not.seq_num;
    if (complete<stable){
        // Create an outgoing "acknowledgment-only" segment,
        // ack-segment, with stable+1 in the acknowledgment field.
        // Be careful not to change advertised window size.
        // ack_segment.window=top;
        NIC_Outgoing_segment(ack_segment);
    }

The connection-oriented protocol layer 506 delivers outgoing segments to the network connection 512. These segments are intercepted by the south side wrapper 510. Responsibilities of the south side wrapper 510 on outgoing TCP segments include altering the acknowledgment field in the segment to make it consistent with what data is recoverable (i.e. stable at the log server 508). If it is not, the present invention will either defer transmission of the segment until it is stable, or change the ack field to represent stable and then follow up with an ack-only when the stability eventually comes in. The present invention will typically alter the ack field if there are data contents to the outgoing segment (i.e. a data transfer for outstream), and defer if it is ack-only. The psuedocode is as follows:

top:=segment.window;
    if(segment.ack_num<stable+1){
        complete:=segment.ack_num−1;
        NIC_Outgoing_segment(segment);
    } else {
        if (segment.length=0){
        return;
        // This assumes that there is a high probability that
        // stability notification will return and subsequent ack
        // sent within the client's timeout window.
    } else {
        segment.ack_num:=stable+1;
        segment.checksum TCP_checksum(segment);
        NIC_Outgoing_segment(segment);
        }
    }

Figure 13:
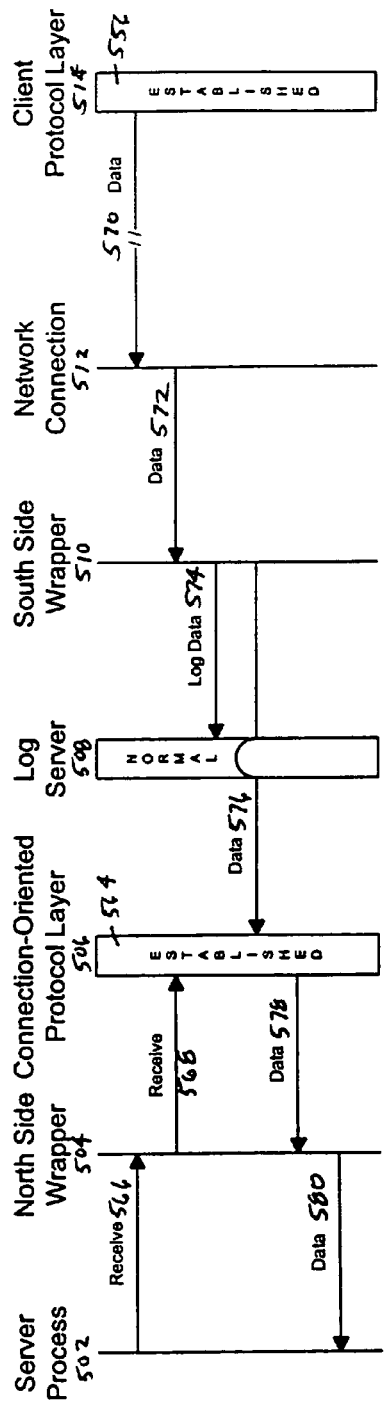
FIG. 13 depicts a TCP normal incoming data sequence in accordance with one embodiment of the present invention.

Now referring to FIG. 13, a receive operation 566 from the server process 502 informs the connection-oriented protocol layer 506 that the application is ready for incoming data. As data segments 570 are received from the client protocol layer 556 by the server network connection 512, the corresponding TCP data segments 572 are sent to the south side wrapper 510 where the data 574 is logged 574 with the log server. The south side wrapper 510 also send data segment 576 to the connection-oriented protocol layer 506. The connection-oriented protocol layer 506 converts the TCP data segments 576 into contiguous application data 578, passes through the north side wrapper 504, and sends contiguous application data 580 into the buffer for the server process 502.

Figure 14:
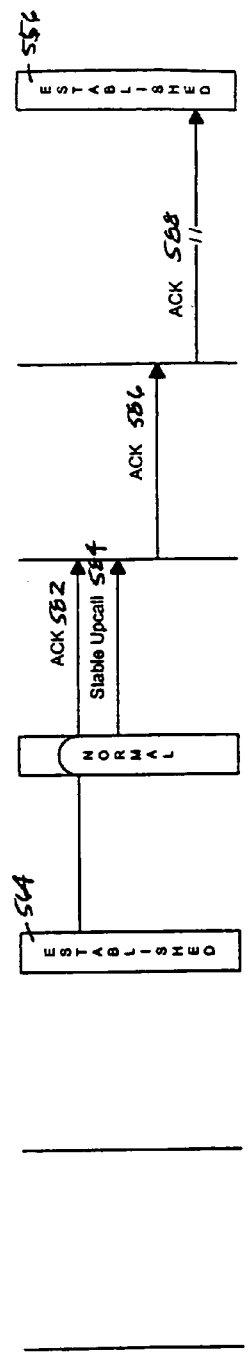
FIG. 14 depicts a TCP normal outgoing acknowledgment sequence in accordance with one embodiment of the present invention.

Referring now to FIG. 14, after receipt of a data segment, such as 576 (FIG. 13), at the connection-oriented protocol layer 506, an ACK segment 582 is sent to the south side wrapper 510 where it is held until a stable upcall 584 is received which means that the data has been properly stored in stable storage and the process can continue. The south side wrapper 510 sends an ACK segment 586 to the network connection 512 which in turn sends the ACK segment 588 to the client protocol layer 514. The acknowledgment is omitted if there is a gap between the data it was expecting and that which the segment contained. At the discretion of TCP, the acknowledgment may be delayed and or piggy-backed on outgoing data.

Figure 15:
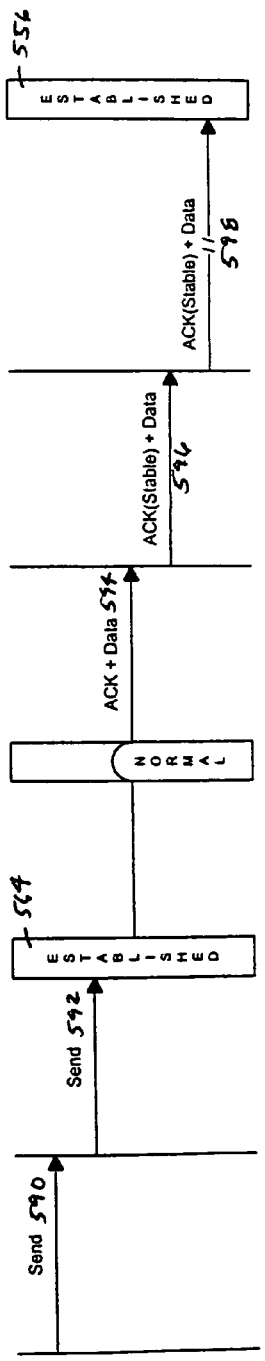
FIG. 15 depicts a TCP normal outgoing acknowledgment with data sequence in accordance with one embodiment of the present invention.

Now referring to FIG. 15, a send operation 590 from the server process 502 to the north side wrapper 504 is sent to the connection-oriented protocol layer 506 via send operation 592, and is transformed into the transmission of one or more TCP segments between TCP peers. As illustrated, the ACK+Data segment 594 is sent from the connection-oriented protocol layer 506 to the south side wrapper 510 where the ACK+Data segment 594 is altered to acknowledge the last data segment that has been properly stored in stable storage. The south side wrapper 510 sends an ACK (stable)+Data segment 596 to network connection 512. The ACK (stable)+Data segment 598 is then sent to the client protocol layer 514.

Figure 16:
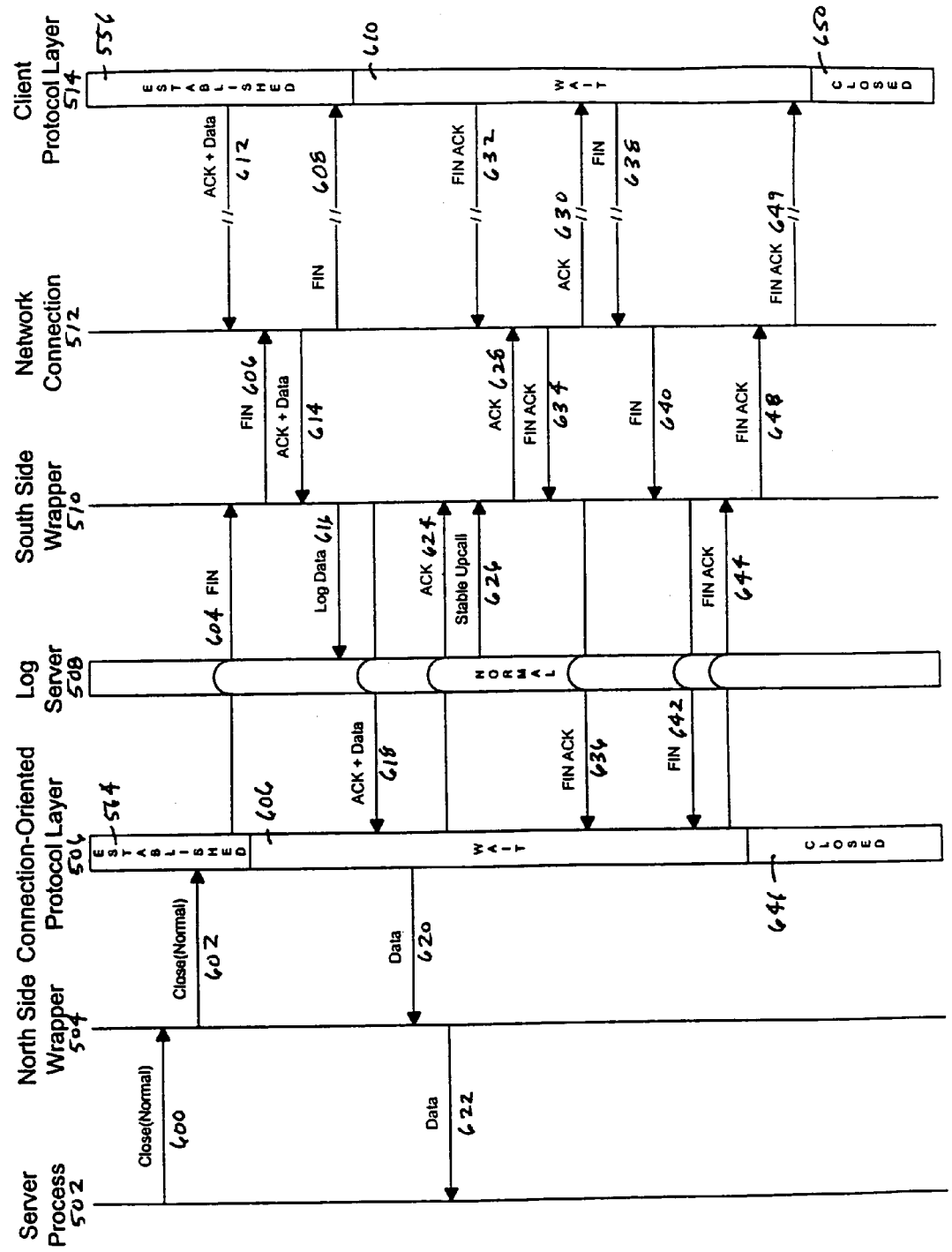
FIG. 16 depicts a TCP process initiated normal close sequence in accordance with one embodiment of the present invention.

Referring now to FIG. 16, a normal close session, which may be initiated by either the client or the server, is shown. The server process 502 initiates the close operation 600 via the north side wrapper 504 and close operation 602 via the connection-oriented protocol layer 506, which changes to a wait mode 606 and sends a FIN segment 604 to the south side wrapper 510. The south side wrapper 510 sends a FIN segment 606 to the server network connection 512. After the client protocol layer 514 receives the FIN segment 608, it changes to a wait mode 610. The client protocol layer 514 sends a FIN-ACK segment 632 to the network connection 512, which sends a FIN-ACK segment 634 to the south side wrapper 510. The south side wrapper 510 then sends FIN-ACK segment 636 to the connection-oriented protocol layer 506.

Meanwhile, client protocol layer 514 sends an ACK+Data segment 612 to the network connection 512, which sends an ACK+Data segment 614 to the south wrapper 510. The data 616 is logged in the log server 508, while the ACK+Data segment 618 is sent to the connection-oriented protocol layer 506. The data 620 is sent to the north side wrapper 504, which sends data 622 to the server process. The connection-oriented protocol layer 506 also send and ACK segment 624 to the south side wrapper 510. The ACK segment 628 is held until a stable upcall 626 is received. Thereafter, ACK segment 628 is sent to the network connection 512 and ACK segment 630 is sent to the client protocol layer 514.

Once the last ACK segment 630 is received, the client protocol layer 514 sends a FIN segment 638 to the network connection 512, which in turn sends FIN segment 640 to the south side wrapper 510. The south side wrapper 510 sends the FIN segment 642 to the connection-oriented protocol layer 506. The connection-oriented protocol layer 506 continues to wait. Once the client receives all the data, the client protocol layer 514 sends a FIN segment 638 to the network connection 512, which sends FIN segment 640 to the south side wrapper 510. The south side wrapper 510 sends the FIN segment 642 to the connection-oriented protocol layer 506. The connection-oriented protocol layer 506 then sends a FIN-ACK segment 644 to the south side wrapper 510 and changes to a closed mode 646. The south side wrapper 510 then sends FIN-ACK segment 648 to the network connection 512. The network connection 512 sends FIN-ACK segment 649 to the client protocol layer 514, which then changes to a closed mode 650.

Now referring to FIG. 17, an abnormal connection termination, which may be in response to a number of different conditions, is shown. An abnormal close operation 652 from the server process 502 initiates an abnormal connection termination. After receipt of the abnormal close operation 652, the north side wrapper 504 sends the abnormal close operation 654 to the connection-oriented protocol layer 506, which sends a FIN segment 656 to the south side wrapper 510 and changes to a closed state 658. The south side wrapper 510 discards the FIN segment 656 and does not transmit it to the network connection 512. As a result, the client protocol layer 514 thinks that the connection is still open and remains in a connection established state 556.

Referring now to FIG. 18, an abnormal connection termination, which may be in response to a number of different conditions, is shown. An abort operation 660 from the server process 502 initiates an abnormal connection termination. After receipt of the abort operation 660, the north side wrapper 504 sends the abort operation 662 to the connection-oriented protocol layer 506, which sends a RST segment 664 to the south side wrapper 510 and changes to a closed state 666. The south side wrapper 510 discards the RST segment 664 and does not transmit it to the network connection 512. In addition, an ICMP message is also sent to inform the host about the status of the connection. If the client 514 were to receive the ICMP message, it would reset the connection, even without receiving the RST segment 664. Unfortunately, the ICMP message is created by the network connection layer 512 below the south side wrapper 510 and it is not easy to intercept and discard at the server. This problem is solved by altering the ICMP message so that its checksum is invalidated, thereby ensuring that the client's network connection layer drops the altered ICMP message 668 without acting on it. As a result, the client protocol layer 514 thinks that the connection is still open and remains in a connection established state 556.

The recovery process consists of four phases, namely initialization, logging, recovery, and termination. The following terms are used in the recovery protocol. Note, we need the server IP address from the packet since the server may have multiple interfaces. This data is ultimately stored in a structure in the log server 508.

(1) dest_endpoint: the destination IP address and port number.
(2) dest_sequence: initial destination sequence number.
(3) opts: the TCP options.
(4) src_sequence: initalize server sequence number.
(5) src_endpoint: server IP address and port number.
(6) rtt: the connection round trip time.
(7) new_port: the new server port number on recovery (might be modified many times).
(8) new_sequence: the new server sequence number on recovery (might be modified many times).

During the TCP 3-way handshake, the south side wrapper 510 needs to extract information from all three of the packets involved in the establishment of a connection. Furthermore, it may be necessary to also log data on the SYN-ACK from the client to the server.

Upon seeing the SYN packet, the south side wrapper 510 performs the following action. The pseudocode is:

if(packet & SYN && !(packet & ACK))
{
   dest_endpoint.ip:=packet.sender.ip;
   dest_endpoint.port:=packet.sender.port;
   dest_sequence:=packetsender.sequence; //TCP options
   opts:=packet.options;
}

Upon seeing the SYN-ACK packet, the south side wrapper 510 performs the following action. The pseudocode is:

if (packet & SYN packet & ACK && myip==packet.src.ip)
{
   src_endpoint.ip:=packet.sender.ip;
   src_endpoint.port:=packet.sender.port;
   src_sequence:=packet.sender.sequence;
}

The second SYN-ACK packet also contains a round trip time (RTT). Although the RTT is computed during the 3-way handshake, the present invention does not need to simulate the latency upon recovery. For completeness, the present invention stores it in case it is needed in the future. The pseudocode is if (packet & SYN && packet & ACK && myip==packet.dest.ip)
{
   rtt:=packet.rtt,
}

These functions could be rolled into a single if-else tree. Also, if the connection is rejected, the log server will receive the packet and act appropriately.

When the failure of the server process 502 is detected, the server process 502 is restarted, and the log server 508 is queried for all open connections. These connections are reconstructed on the restarted server. There are three parts to recovery: connection establishment, roll forward, and continuation.

To reestablish a connection, the log server 508 provides a list of active connections to a process. This process then communicates the list to the south side wrapper 510. The south side wrapper 510 will open each connection in the list and keep track of the sequence and acknowledgment numbers that must be replaced. The south side wrapper 510 receives the initialization data consisting of the dest_endpoint, src_endpoint, src_sequence, opts, and rtt. Since data is passed directly into the north side wrapper 504, the sequence number of the client needs to be adjusted when the connection request is made and ultimately on every packet. Alternatively, the connection can be opened with the altered client's sequence number set to stable. This precludes having to alter the clients sequence on every subsequent outgoing packet. It does not, however, save the trouble of altering the server sequence number. If a connection is rejected the spoofed connection request is retried. The psedudocode is:

```
// create a new connection packet
connect_packet:=new tcp_packet;
packet.flags:=SYN;
packet.src.:=dest_endpoint.ip;
packet.src.port:=dest_endpoint.port;
// client's init. seq. number needs to be adjusted for all
// packets that were previously acknowledged.
packet.src.sequence:=dest_sequence+complete;
packet.opts:=opts;
// local IP address (
packet.dest.ip:=source_endpoint.ip;
packet.dest.port:=source_endpoint.port;
compute_checksum(packet);
TCP_Transport_Incoming_Segment(packet);
```

Now the south side wrapper 510 actively watches each outgoing packet for a packet with the same dest-endpoint. The south side wrapper 510 inspects the packet for either a SYN-ACK or RST packet.

```
// wait for the replay from TCP stack
if      (packet.dest.ip==dest_endpoint.ip      &&
    packet.dest.port==dest_endpoint.port)
{
  // found the right packet
  if (packet.flags & RST)
  {
    delete packet;
    terminate logging;
  }
  // the original rtt on the log server
  sleep(rtt);
  // get the translation sequence, port numbers
  new_port:=packet.src.port;
  new_sequence:=packet.src.sequence;
  // modify packet
  packet.flags:=SYN|ACK;
  // exchange sender receiver, seq, ip, port, etc.
  packet.src=packet.src^packet.dest;
  packet.dest=packet.src^packet.dest;
  packet.src=packet.src^packet.dest;
  compute_checksum(packet);
  TCP_Transport_Incoming Segment(packet);
}
```

Following connection establishment, the server process 502 is rolled forward. This is accomplished by retrieving the data from the log server 508 and putting it into the north side wrapper 504. Then the data is passed up to the server process 502. The response from the server process 502 is trapped until the stable point is reached, then the data is allowed to go through the TCP stack. The psedocode is:

```
// we should just pass whatever data is on the log server
//  up to the server process
while (data:=log_data)
{
  Application_Incoming_Segment(data);
  junk=Application_Outgoing Segment ( );
  delete junk;
}
```

At this point, the server process 502 and the client should be synchronized.

After the server process 502 is rolled forward, the system proceeds as before. The south side wrapper 510, however, needs to modify packet port numbers, sequence numbers, and recompute checksums on both incoming and outgoing packets. The pseudocode is:

```
if      (packet.dest.ip==dest_endpoint.ip      &&
    packet.dest.port==dest_endpoint.port)
{
  // modify sending port on outgoing packets
  packet.src.port:=src_endpoint.port;
  // adjust the sequence number
  // sequence+=original sequence-new sequence
  packet.src.sequence+=src.sequence-packet.src.se-
    quence;
  segment.checksum:=TCP_checksum(packet);
}
else    if(packet.dest.ip==src_endpoint.ip      &&
    packet.dest.port==src-endpoint.port
{
  // modify destination port on incoming packets
  packet.dest.port:=newport;
  // modify the ack sequence number
  packet.dest.sequence+=src.sequence-packet.src.se-
    quence;
  // recompute the checksum
  segment.checksum:=TCP_checksum(packet);
}
```

As the new-port and new-sequence provide a 1:1 translation that is dependent on the actual connection. These values do not need to reside on the log server 508 because if a subsequent failure is detected, these values are recomputed.

The last stage is termination. There are a few conditions that occur to indicate that the logging session should be closed.

(1) A packet is received that indicates to the server that the client wishes to close the connection (FIN bit set). This not done with a send from the server since there may still be inflight data from the client to the server.

(2) The server responds with a RST packet (rejecting the connection request).

(3) Some period of time has elapsed with no "keep-alive" packets received. Some multiple of the RTT seemed to be an appropriate time-out at which maintain a set of timers that allow it to time-out and terminate logging sessions asynchronously. Since the log server is 508 "smart" it can see that the connection is closing when the south side wrapper sends the packet and can release resources allocated to that connection. The pseudocode is:

```
// this routine is executed either by some timeout or an
//  explicit close
if((packet.flags & FIN && packet.flags & ACK )||
  (current_time-time(last_packet)>timeout)||
  (packet.flags & RST))
{
  delete log data and connection entries;
  return;
}
```

In order to maintain a lightweight south side wrapper 510, the log server 508 contains most of the logic needed to recover the server process 502 after it crashes. The log server 508 manages connection parameters, connection data, and provides both an interface to the north side wrapper 504 and the south side wrapper 510, as well as an interface to communicate with server process 502.

The log server 508 maintains connection structures for each established connection.

The log server 508 uses these connection structures to recover the connection by passing them to an application who subsequently communicates the information to the south side wrapper 510. For example, the pseudocode may be as follows:

struct log_connection-struct {
server_ip;
server_port;
dest_ip;
dest_port;
opts;
stable;
server_seq;
dest_seq;
modifed; // time this structure either modified or created created}

The following functions provide a generic interface to the log server 508. Particular care is taken to specify an interface that functions whether the log server 508 is local or remote. If the log server 508 is remote, an intermediate layer may needed in a network implementation to handle the translation from pointers to data packets.

The log_query_num_active function returns the number of active connections so that the process can adequately allocate memory. The pseudocode is unsigned log_query_num_active ( ).

The log-query-active function is called upon recovery to determine which connections were open during a crash. The arguments are the first and last connection to retrieve respectively. In the event that a contiguous piece of memory cannot be allocated, this function allows the list to be broken into several pieces. The value is 0 based, as a result, the value of end is 1 less than the value returned by the num-active function. Preferably, each connection will be maintained in a distinct chunk of memory to ease the destruction and creation of further connections. The pseudocode is:

struct*log_connection_struct log_query_active(unsigned start, unsigned end).

The log_query_endpoint function returns a connection structure defined by the specified endpoint. Either the source or destination endpoint is required. This function returns a pointer to the structure or a void if nothing matching the endpoint exists. The psuedocodeis:

struct*log_connection_struct log query_endpoint(_u32 address, _u16 port).

The log_write function performs the bulk of the log server 508 work. In order to maintain the simplicity of the south side wrapper 510, this function is a bit more complex. This function essentially runs in parallel with the TCP stack though, so its latency is masked. The second argument is a pointer to the packet and the first argument is the length of the packet pointed to by the second argument. The return value will be composed of a set of flags indicating the operation performed by the log server 508 as well as the size of the data for that connection. The return value can be used for expansion, but will probably not be used to return this parameter all the way to the south side wrapper 510. Upon each write, this function extracts the relevant information (in general only the data) and archives it on stable storage. It then updates stable in the structure and performs the necessary work to generate an upcall to the south side wrapper 510. The psuedocode is:

unsigned long log_write(unsigned size, unsigned char*packet).

The log-connection_data_length function returns the total size of all the data for a particular connection so that the caller may allocate sufficient memory to retrieve the data. The psuedocode is:

unsigned long log_connection_data_length(struct log_connection_struct).

The log_read function returns data to the caller for a particular connection. The parameters are a connection structure, as well as a data pointer, and the start and end offsets in the data stream. It is not an error to pass an end value past the end of the data since the log server 508 returns the amount actually written. The function returns the size of the data written to the area pointed to. This function will pass only the data. To retrieve a connection structure, a different function is used. The psuedocode is:

unsigned log_read(struct log_connection_struct, unsigned char*data, unsigned start, unsigned end);

The log-install-upcall function provides an interface for the south side wrapper 510 to install its upcall function. Preferably, the south side wrapper 510 installs a single upcall and then as it receives upcalls, it can update a hash table of endpoints and acknowledgement numbers. Then as it encounters each outgoing packet, it hashes into the table and retrieves the acknowledgement. The psuedocode is:

void log_install_upcall((void*)_u32 sequence_number, _u32 dest_addr, _u32 port));

The log-status-upcall log-status function provides a method so that the log server 508 can indicate to the primary server that a failure is imminent or has already occurred. This allows the primary server to avoid sending packets to the log server 508 if it is going to fail soon. The status is returned as a series of flags indicating amongst other things, FAILED, LOW-SPACE, OK, EXPIRED-CONNECTION, and OTHER-ERROR. The psuedocode is:

void log_install_upcall((void*)(unsigned status));
unsigned log_status( ).

The log-register-service function add efficiency by only allowing the log server 508 to log services that are registered. A port number is passed to indicate a particular connection request. If the port number is 0, then all connections are logged.

void log_register_service(_u16 port).

Other functions can be used to enhance the operation of the log server 508. For example, the log server 508 may never see a packet from a client again. The TCP stack will assume that the client is dead and proceed with closing the connection, however the log server 508 does not know about this action. Accordingly, the log server 508 can implement a type of garbage collection based on the created and modified fields in the connection structure so that if a connection has not been active for a period of time, then the log server 508 automatically cleans the log and releases the memory used by the connection.

Figure 19:
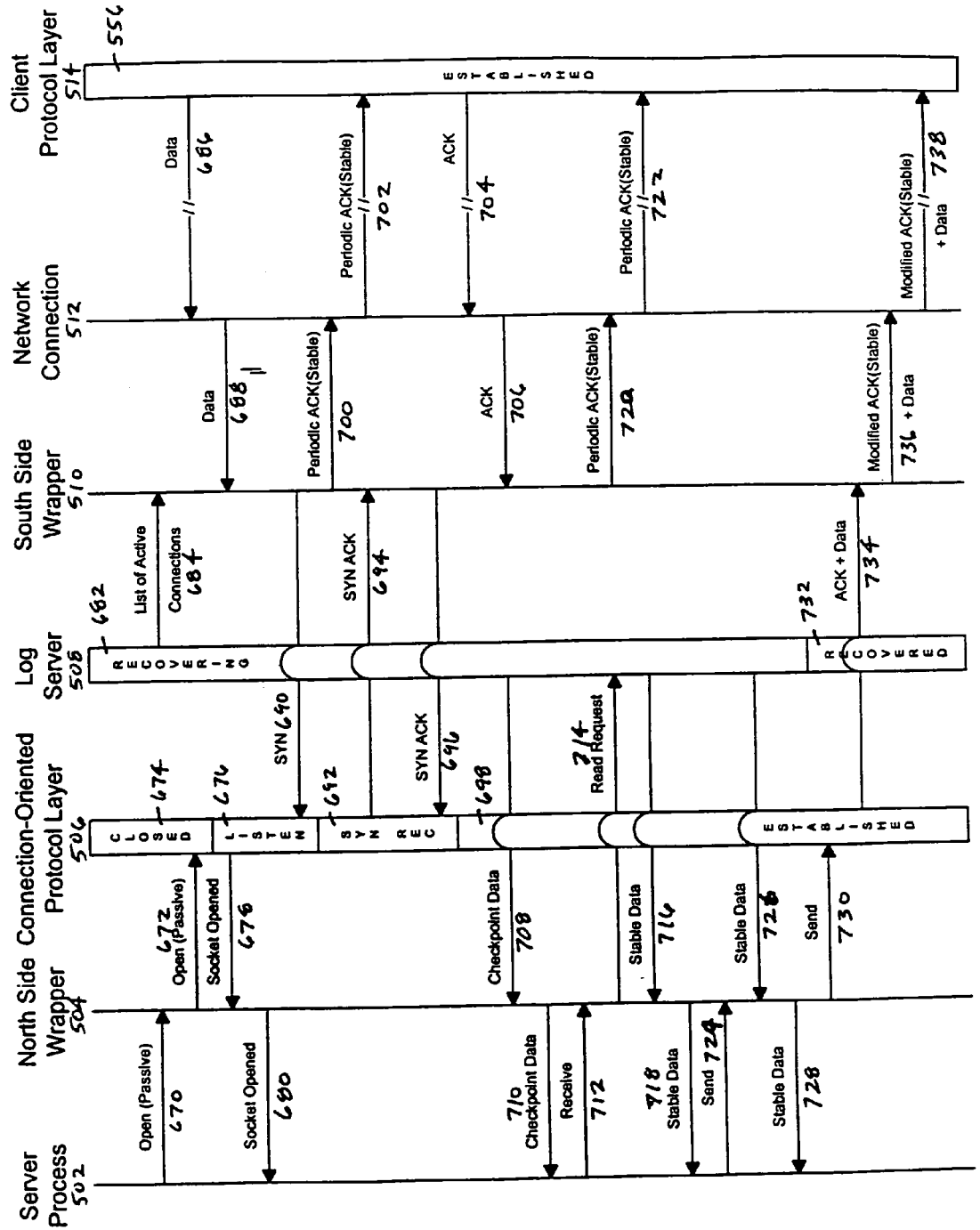
FIG. 19 depicts a TCP process recovery sequence in accordance with one embodiment of the present invention.

Referring now to FIG. 19, the recovery initialization and roll forward process in accordance with one embodiment of the present invention is shown. This process is initiated after an abnormal close or abort operation issued by the server process 502 as described in reference to FIGS. 17 and 18. Accordingly, the connection-oriented protocol layer 506 is in a closed state 674, the log server 508 changes from a normal state to a recovering state 682, and the client protocol layer 514 is in a connection established state 556. When the server process 502 is restarted, it issues a passive open call 670 to the north side wrapper 504, which sends a passive open call 672 to the connection-oriented protocol layer 506 which is in a closed mode 674. The connection-oriented protocol layer 506 responds by establishing a TCP port, which is used to identify the server process 502 as being available for connection with a client, and changing to a listen mode 676. The connection-oriented protocol layer 506 then sends a socket opened message 678 to the north side wrapper 504, which sends a socket opened message 680 to the server process 502 and waits for a client to request a connection to the server process 502. In the meantime, the log server 508 sends a list of active connections 684 to the south side wrapper 510, so that any data sent to the failed connections can be intercepted. For example, during the recovery process, the client protocol layer 514 may send data 686 to the network connection 512. The network connection then sends the data 688 to the south side wrapper 510, which "discards" the data 688 without forwarding it to the connection-oriented protocol layer 506.

After the connection-oriented protocol layer 506 changes to the listen state 676, the south side wrapper 510 generates and sends a SYN segment 690 to the connection-oriented protocol layer 506. The connection-oriented protocol layer 506 changes state to SYN received 692 and sends a SYN-ACK segment 694 to the south side wrapper 510, which stores the relevant connection information and sends a SYN-ACK segment 696 back to the connection-oriented protocol layer 506. The connection-oriented protocol layer 506 then changes to a connection established mode 698. Note that this is a new port, rather a reconnection to the port that is known to the client protocol layer 514. In addition, the south side wrapper 510 will periodically send an ACK segment 700 for the last data stored in the stable storage to the network connection 512, which will in turn send the ACK segment 702 to the client protocol layer 514. The client protocol layer 514 will respond by sending ACK segment 704 to the network connection 512, which in turn sends ACK segment 706 to the south side wrapper 510. The south side wrapper 510 "discards" the ACK segment 706 and does not send it to the connection-oriented protocol layer 506. These periodic acknowledgments prevent the client protocol layer 514 from timing out and closing its connection with the server process 502 while it is recovering. Moreover, the periodic acknowledgments inform the client protocol layer 514 that all data since the last data stored in stable storage needs to be resent.

The log server 508 sends checkpoint data 708 to the north side wrapper 504, which then sends the checkpoint data 710 to the server process 502. The checkpoint data 708 is used to return the server process 502 to the last stored system state. The server process 502 then sends a receive operation 712 to the north side wrapper 504, which submits a read request 714 to the log server 508. The log server 508 returns stable data 716 to the north side wrapper 504, which then sends the stable data 718 to server process 502. The server process 502 sends a send operation 724 to the north side wrapper 504. Stable data 726 is sent from the log server 508 to the north side wrapper 504, which sends the stable data 728 to the server process 728. This process is repeated until the server process is brought up to date the last data received before the failure. During this process, the north side wrapper 504 spoofs the server process 502 to think that it is the client protocol layer 514. In the meantime, the south side wrapper 510 periodically sends ACK segments 720 for the last data stored in the stable storage to the network connection 512, which in turn sends the ACK segments 722 to the client protocol layer 514.

Once the server process 502 has been brought back to a pre-failure state, the log server changes to a recovered mode 732. In addition, the server process 502 sends data 724 to the north side wrapper 504, which in turn sends the data 730 to the connection-oriented protocol layer 506. The connection-oriented protocol layer 506 sends and ACK+Data segment 734 to the south side wrapper 510 that modifies the header information in the segment to spoof the client protocol layer 514 to think the server process 502 never failed. The modified ACK+Data segment 736 is sent to the network connection 512, which sends the modified ACK+Data segment 738 to the client protocol layer 514.

Now referring to FIG. 20, a receive operation 740 from the server process 502 is sent to the north side wrapper 504, which sends a receive operation 742 to the connection-oriented protocol layer 506. As data segments 744 are received from the client protocol layer 514 by the server network connection 512, the corresponding TCP data segments 742 are sent to the south side wrapper 510 where the data 748 is logged with the log server 508. The south side wrapper 510 modifies the header information of data 746 to correspond to the new port number for this client and the server process 502. The modified segment+data 750 is sent to the connection-oriented protocol layer 506, which converts the TCP data segments 750 into contiguous application data 752 and sends data 752 to the north side wrapper 504. The north side wrapper 504 then sends contiguous application data 754 to the server process 502.

Referring now to FIG. 21, after receipt of a data segment, such as 750 (FIG. 20), at the connection-oriented protocol layer 506, an ACK segment 756 is sent to the south side wrapper 510 where it is held until a stable upcall 758 is received which means that the data has been properly stored in stable storage and the process can continue. The south side wrapper 510 then modifies the header information of the ACK segment 756 to correspond to the old server-client connection and sends the modified ACK segment 760 to the network connection 512 which in turn sends the modified ACK segment 762 to the client protocol layer 514. The acknowledgment is omitted if there is a gap between the data it was expecting and that which the segment contained. At the discretion of TCP, the acknowledgment may be delayed and or piggybacked on outgoing data.

Now referring to FIG. 22, a send operation 764 from the server process 502 to the north side wrapper 504 is sent to the connection-oriented protocol layer 506 via send operation 766, and is transformed into the transmission of one or more TCP segments between TCP peers. As illustrated, the ACK+Data segment 768 is sent from the connection-oriented protocol layer 506 to the south side wrapper 510 where the header of the ACK+Data segment 768 is modified to correspond to the old server-client connection. The south side wrapper 510 sends the modified ACK+Data segment 770 to network connection 512. The modified ACK+Data segment 772 is then sent to the client protocol layer 514.

Figure 23:
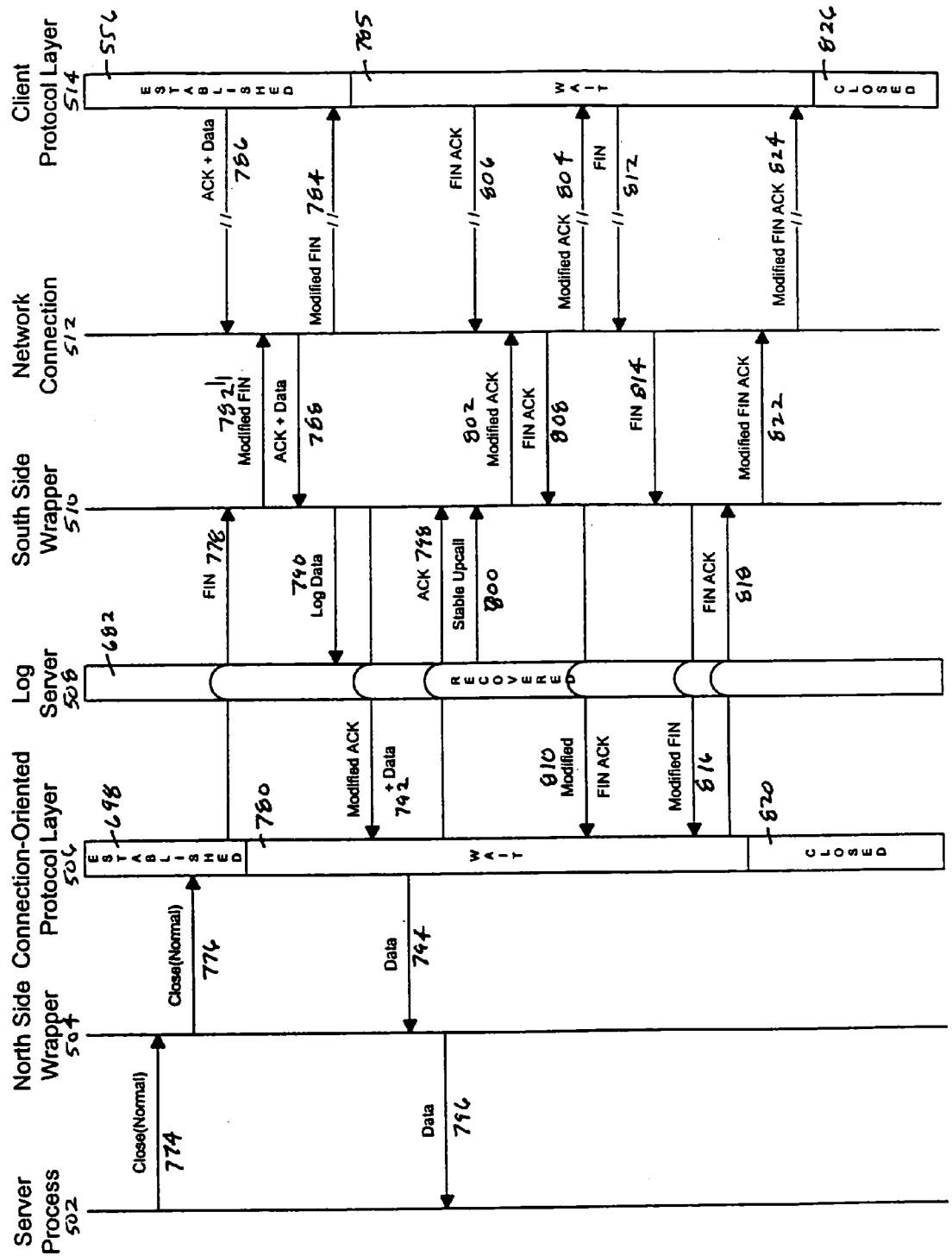
FIG. 23 depicts a TCP process initiated post-recovery close sequence in accordance with one embodiment of the present invention.

Referring now to FIG. 23, a normal close session, which may be initiated by either the client or the server, is shown. The server process 502 initiates the close operation 774 via the north side wrapper 504 and close operation 776 via the connection-oriented protocol layer 506, which changes to a wait mode 780 and sends a FIN segment 778 to the south side wrapper 510. The south side wrapper 510 modifies the header information of the FIN segment 606 to correspond to the old client-server connection and then sends a modified FIN segment 782 to the server network connection 512. After the client protocol layer 514 receives the modified FIN segment 784, it changes to a wait mode 785. Meanwhile, client protocol layer 514 sends an ACK+Data segment 786 to the network connection 512, which sends an ACK+Data segment 788 to the south side wrapper 510. The data 790 is logged in the log server 508, while the south side wrapper 510 modifies the ACK+Data segment 788 to correspond to the new connection and sends the modified ACK+Data segment 792 to the connection-oriented protocol layer 506. The data 794 is sent to the north side wrapper 504, which sends data 796 to the server process 502. The connection-oriented protocol layer 506 also sends an ACK segment 798 to the south side wrapper 510. The header information of the ACK segment 798 is modified to correspond the old client-server connection and is held until a stable upcall 800 is received. Thereafter, modified ACK segment 802 is sent to the network connection 512 and modified ACK segment 804 is sent to the client protocol layer 514.

The client protocol layer 514 sends a FIN-ACK segment 806 to the server network connection 512, which in turn sends FIN-ACK segment 808 to the south side wrapper 510. The south side wrapper 510 modifies the header information of the FIN-ACK segment 808 to correspond with the new connection and sends the modified FIN-ACK segment 810 to the connection-oriented protocol layer 506. The connection-oriented protocol layer 506 continues to wait. Once the client receives all the data, the client protocol layer 514 sends a FIN segment 812 to the server network connection 512, which sends FIN segment 814 to the south side wrapper 510. As before, the south side wrapper 510 modifies the header of FIN segment 814 to correspond to the new connection and sends the modified FIN segment 816 to the connection-oriented protocol layer 506. The connection-oriented protocol layer 506 then sends a FIN-ACK segment 818 to the south side wrapper 510 and changes to a closed mode 820. The south side wrapper 510 modifies the header information of the FIN-ACK segment 818 to correspond to the old connection and sends the modified FIN-ACK segment 822 to the network connection 512. The network connection 512 sends the modified FIN-ACK segment 824 to the client protocol layer 514, which then changes to a closed mode 826.

Although preferred embodiments of the invention have been described in detail, it will be understood by those skilled in the art that various modifications can be made therein without departing from the spirit and scope of the invention as set forth in the appended claims.

The invention claimed is:

1. A method of recovering from a failure of a server to a client, comprising:

using wrapping layers to intercept communications to a connection-oriented protocol layer, the communications originating from a network layer and a process layer of a layered communications framework, wherein a first wrapping layer is interposed between the process layer and the connection-oriented protocol layer, and wherein a second wrapping layer is interposed between the network layer and the connection-oriented layer;

logging the intercepted communications and connection state information associated with intercepted communications received from the wrapping layers;

determining when a connection with the server fails;

responding to the client on behalf of the server by the wrapping layers based on at least, in part, on the logged connection state information; and restoring a state of connection associated with the connection-oriented layer prior to the failure, based on at least, in part, on the connection state information received from the wrapping layers, wherein restoring the state of connection associated with the connection-oriented layer is invisible to the client and wherein recovery from failure of the server by the client does not involve interposing a proxy or intermediary.

2. The method as recited in claim 1, wherein in the connection-oriented layer is a Transmission Control Protocol Layer.

3. The method as recited in claim 1, wherein the network layer is an Internet Protocol layer.

4. The method as recited in claim 1, wherein the process layer is an Application layer.

5. The method as recited in claim 1, wherein the logging of the intercepted communications and connection state information is performed on a processor separate from a processor executing the server.

6. The method as recited in claim 1, wherein the first wrapping layer is a south side wrapper.

7. The method as recited in claim 1, wherein the second wrapping layer is a north side wrapper.

8. A system for recovering from a failure of a server to a client, comprising:

means for intercepting communications to a connection-oriented protocol layer, the communications originating from a network layer and a process layer of a layered communications framework, the means for intercepting communications being interposed between the process layer and the connection-oriented protocol layer, and between the network layer and the connection-oriented layer;

means for logging the intercepted communications and connection state information associated with intercepted communications;

means for determining when a connection with the server fails;

means for responding to the client on behalf of the server based on at least, in part, on the logged connection state information; and means for restoring a state of connection associated with the connection-oriented layer prior to the failure, based on at least, in part, on the connection state information, wherein restoring the state of connection associated with the connection-oriented layer is invisible to the client and wherein restoring the state of connection from failure of the server to the client does not involve interposing a proxy or intermediary between the client and server.

* * * * *